US009025246B2

(12) United States Patent
Oda

(10) Patent No.: US 9,025,246 B2
(45) Date of Patent: May 5, 2015

(54) OBSERVATION SYSTEM AND METHOD OF CONTROLLING OBSERVATION SYSTEM

(71) Applicant: Panasonic Healthcare Co., Ltd., Toon-shi, Ehime (JP)

(72) Inventor: Atsushi Oda, Osaka (JP)

(73) Assignee: Panasonic Healthcare Holdings Co., Ltd., Tokyo (JP)

( * ) Notice: Subject to any disclaimer, the term of this patent is extended or adjusted under 35 U.S.C. 154(b) by 0 days.

(21) Appl. No.: 14/301,846

(22) Filed: Jun. 11, 2014

(65) Prior Publication Data

US 2014/0333997 A1     Nov. 13, 2014

Related U.S. Application Data

(63) Continuation of application No. PCT/JP2012/081817, filed on Dec. 7, 2012.

(30) Foreign Application Priority Data

Dec. 22, 2011    (JP) ................................ 2011-281112

(51) Int. Cl.
     *G02B 21/00*      (2006.01)
     *G02B 21/10*      (2006.01)
     (Continued)

(52) U.S. Cl.
     CPC .............. *G02B 21/10* (2013.01); *G02B 21/084* (2013.01); *G02B 21/365* (2013.01)

(58) Field of Classification Search
     CPC ...... G02B 21/00; G02B 21/10; G02B 21/084; G02B 21/365
     USPC .................. 359/382, 384, 387–391
     See application file for complete search history.

(56) References Cited

U.S. PATENT DOCUMENTS 6,130,776 A * 10/2000 Takaoka ......................... 359/370
6,243,197 B1 * 6/2001 Schalz ........................... 359/388
(Continued)

FOREIGN PATENT DOCUMENTS

JP      10-301031 A     11/1998
JP      2001-188177 A     7/2001
(Continued)

OTHER PUBLICATIONS

International Publication and International Search Report issued in Application No. PCT/JP2012/081817 dated Feb. 26, 2013.

*Primary Examiner* — Scott J Sugarman
*Assistant Examiner* — William R Alexander
(74) *Attorney, Agent, or Firm* — McDermott Will & Emery LLP

(57) ABSTRACT

An observation system includes: a container holding unit; a ring illumination, including a light source in a ring shape, arranged in a position opposed to an outer bottom surface of a container so that a central axis of the illumination is aligned to that of a bottom surface of the container held by the container holding unit, when an observation target is observed; a first light-shielding plate in a ring shape, having an inner diameter capable of varying, arranged between the illumination and the container holding unit, and configured to shield light from the illumination; a lens, arranged in a position opposed to an inner bottom surface of the container held by the container holding unit, to observe the observation target; and a second light-shielding plate, having an outer diameter capable of varying, arranged in an internal space of the illumination, and configured to shield light from the illumination.

20 Claims, 24 Drawing Sheets

(51) Int. Cl.
　　*G02B 21/08*　　(2006.01)
　　*G02B 21/36*　　(2006.01)

(56) References Cited

U.S. PATENT DOCUMENTS

| | | | |
|---|---|---|---|
| 6,259,557 B1 * | 7/2001 | Miyashita et al. | 359/387 |
| 6,479,807 B1 * | 11/2002 | Toshimitsu | 250/201.3 |
| 7,688,505 B2 * | 3/2010 | Vodyanoy et al. | 359/387 |
| 2004/0070990 A1 * | 4/2004 | Szypszak | 362/555 |
| 2009/0034063 A1 * | 2/2009 | Yamazaki et al. | 359/387 |

FOREIGN PATENT DOCUMENTS

| | | |
|---|---|---|
| JP | 2002-189174 A | 7/2002 |
| JP | 2002-214697 A | 7/2002 |
| JP | 2003-075725 A | 3/2003 |
| JP | 3157973 U | 3/2011 |

\* cited by examiner

LIGHT-SHIELDING PLATE CONTROL TABLE
231

| IC TAG NO. | OUTER DIAMETER OF CONTAINER | INNER DIAMETER OF OUTER DIAMETER LIGHT-SHIELDING PLATE (A1) | OUTER DIAMETER OF INNER DIAMETER LIGHT-SHIELDING PLATE (B1) | HEIGHT OF INNER DIAMETER LIGHT-SHIELDING PLATE (B2) | HEIGHT OF CONTAINER FROM RING ILLUMINATION |
|---|---|---|---|---|---|
| 0001 | 60 | 69 | MIN | MIN | 15 |
| 0002 | 100 | 114 | 106 | 14.3 | 24 |
| ... | ... | ... | ... | ... | ... |

OBSERVATION SYSTEM AND METHOD OF CONTROLLING OBSERVATION SYSTEM

CROSS-REFERENCE TO RELATED APPLICATIONS

This is a continuation application of International Patent Application No. PCT/JP2012/081817 filed Dec. 7, 2012, which claims the benefit of priority to Japanese Patent Application No. 2011-281112 filed Dec. 22, 2011. The full contents of the International Patent Application are incorporated herein by reference.

BACKGROUND

1. Technical Field

The present disclosure relates to an observation system and a method of controlling the observation system.

2. Description of the Related Art

In culturing cells, if it is possible to start observation concurrently with emergence of a cell mass, which is formed by gathering of a plurality of cells, and to conduct the observation sequentially in chronological order, this can be a promising technique, for example, for supporting regenerative medicine. Such observation of cells is conducted when replenishment or replacement of culture fluid in a culture container is required during cell culture, by using a microscope or the like, and images are picked up as needed.

However, observation of cells using a microscope requires much expense in time and effort. For example, in order to identify a cell mass having emerged in a container, first, the whole container needs to be observed visually or by using a microscope, and further, a growing state of the individual cell mass needs to be observed under magnification, for example, by replacing an objective lens. In micro observation, a narrow field of view causes difficulty in searching a target cell mass, and further causes difficulty in adjusting the cell mass to the field of view. When observing cells, it is preferable to conduct time-lapse observation in which a long-term change is observed from a time of the emergence of the cell mass to a time of the completion of growth thereof for every predetermined time period. Since, immediately after seeding of the cell, the cell mass cannot be observed visually, by using a low-magnification microscope, or the like, an observation position needs to be searched and reset several days later.

Further, in the observation that is conducted when culture fluid in a culture container is replenished or replaced usually once in one to three days, it is difficult to conduct observation from a time of the emergence of a cell mass, and thus a technique that is capable of observing a cell mass from the time of the emergence thereof is in high demand.

In order to perform such observation of the cell mass in an appropriate manner, it is important to illuminate the cell mass in the container with appropriate brightness. In various optical devices, techniques for displaying an object with appropriate brightness have been developed (see, e.g., Japanese Laid-Open Patent Publication Nos. 2001-188177 and 2002-214697).

However, the container used for the culturing a cell mass and the like comes in various sizes, and thus it is not easy to have appropriate brightness at the time of observation, whatever container may be used. For example, a ring illumination having a light source provided in a ring shape may be used to reduce uneven illuminance between a center part and a peripheral part of a culture surface, but even in this case, when the containers of different sizes are used, it is difficult to prevent occurrence of uneven illuminance.

Whereas, change in size and the like of the ring illumination according to the size of the container on a case-by-case basis causes an increase in cost, scale of the device, and the like.

Therefore, such a technique is in demand that makes it possible to illuminate the container uniformly with appropriate brightness, even if the sizes of the containers containing observation targets are vary, when observation of cells and the like is conducted.

The present disclosure makes it possible to illuminate, uniformly with proper brightness, containers of various sizes containing observation targets such as cells, bacteria, and microorganisms.

SUMMARY

An observation system according to an aspect of the present disclosure, which is configured to observe a translucent observation target, contained in a translucent container having a bottom surface and a side surface surrounding the bottom surface, includes: a container holding unit configured to hold the container; a ring illumination including a light source in a ring shape having a predetermined radius, the ring illumination arranged in a position opposed to an outer bottom surface of the container so that a central axis of the ring illumination is aligned to a central axis of the bottom surface of the container held by the container holding unit, and configured to irradiate the container with light, when the observation target is observed; a first light-shielding plate in a ring shape, arranged between the ring illumination and the container holding unit so that a central axis of the first light-shielding plate is aligned to the central axis of the ring illumination, the first light-shielding plate having an inner diameter capable of varying around the central axis, the first light-shielding plate configured to shield light from the ring illumination; a lens, arranged in a position opposed to an inner bottom surface of the container held by the container holding unit, to observe the observation target in the container illuminated by the ring illumination; and a second light-shielding plate arranged, in an internal space of the ring illumination, so that a central axis of the second light-shielding plate is aligned to a central axis of the ring illumination, the second light-shielding plate having an outer diameter capable of varying around the central axis, the second light-shielding plate configured to shield light from the ring illumination.

Other features of the present disclosure will become apparent from descriptions of the present specification and of the accompanying drawings.

BRIEF DESCRIPTION OF THE DRAWINGS

For more thorough understanding of the present disclosure and advantages thereof, the following description should be read in conjunction with the accompanying drawings, in which:

FIG. 11 is an exemplary diagram of a light-shielding plate control table according to an embodiment of the present disclosure;

DETAILED DESCRIPTION

At least the following details will become apparent from descriptions of the present specification and of the accompanying drawings.

Hereinafter, embodiments of the present disclosure will be described with reference to FIGS. 1 to 28. Note that, here, for example, a cell, among translucent samples such as cells, bacteria, microorganisms, will be described as a sample, and for example, a culture fluid will be described as a solution. Further, a cell mass, formed by gathering of a plurality of cells, will be described as a sample mass.

First Embodiment

==General Configuration==

Figure 1:
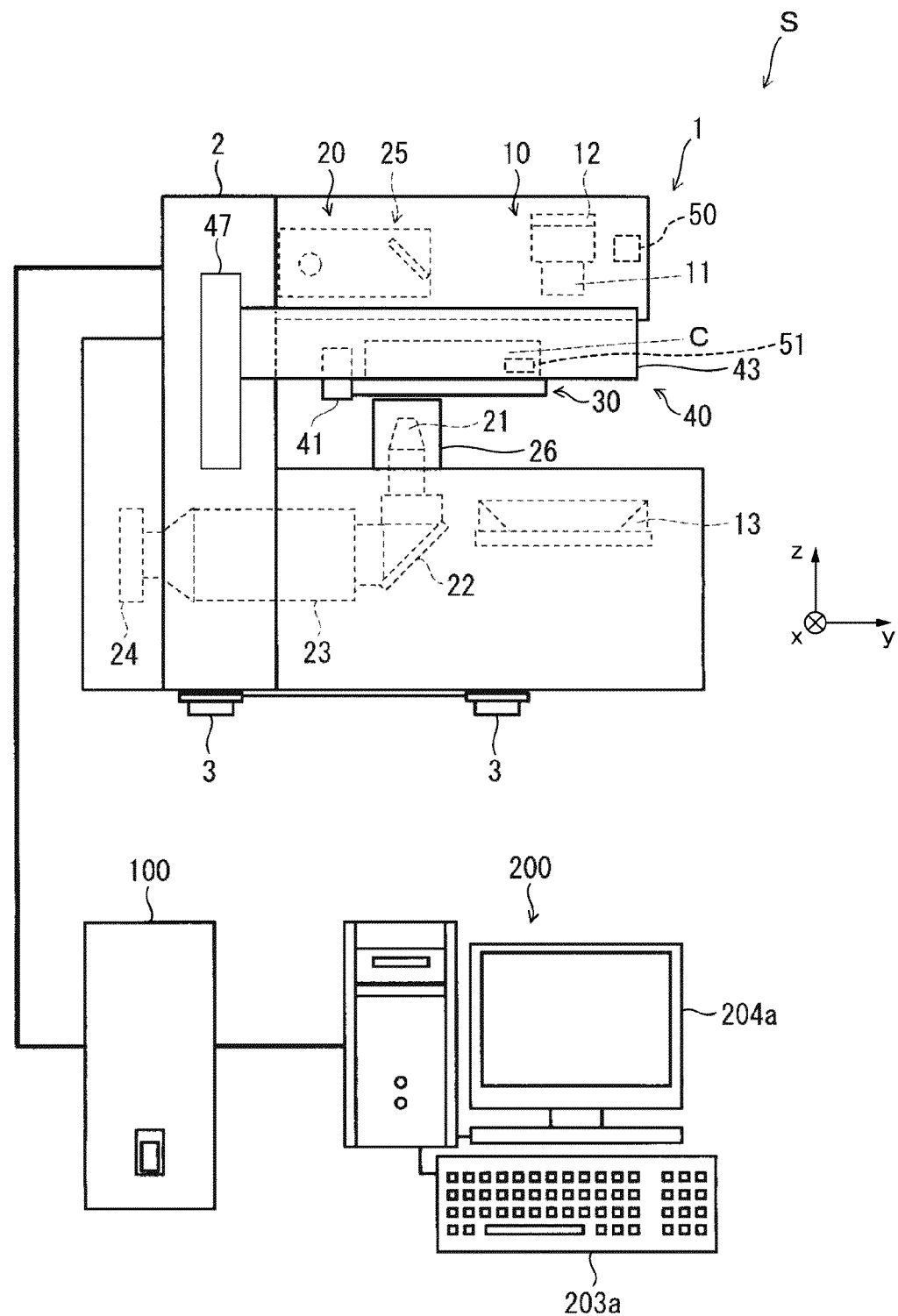
FIG. 1 is an exemplary configuration diagram of an observation system according to an embodiment of the present disclosure.
Figure 2:
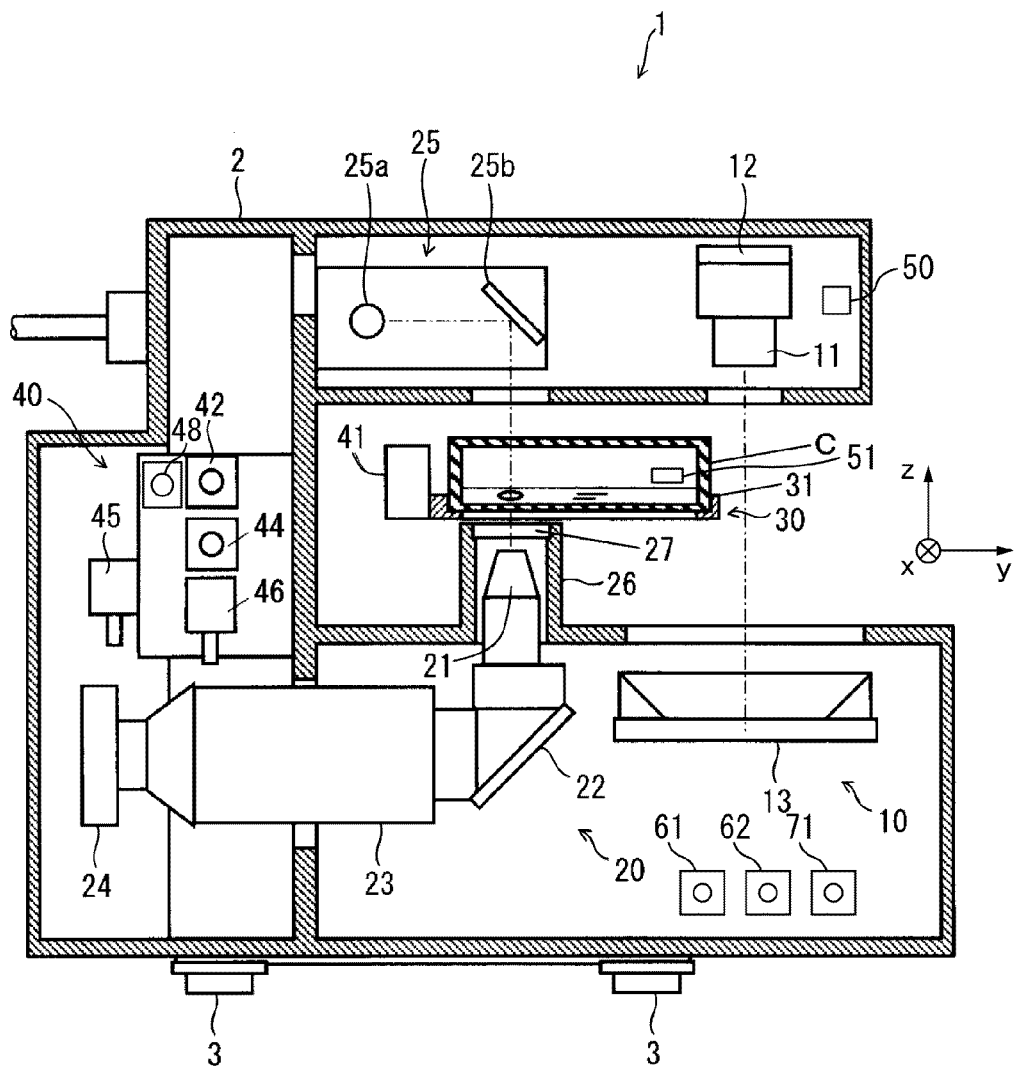
FIG. 2 is an exemplary perpendicular sectional side view of an observation apparatus according to an embodiment of the present disclosure.
Figure 3:
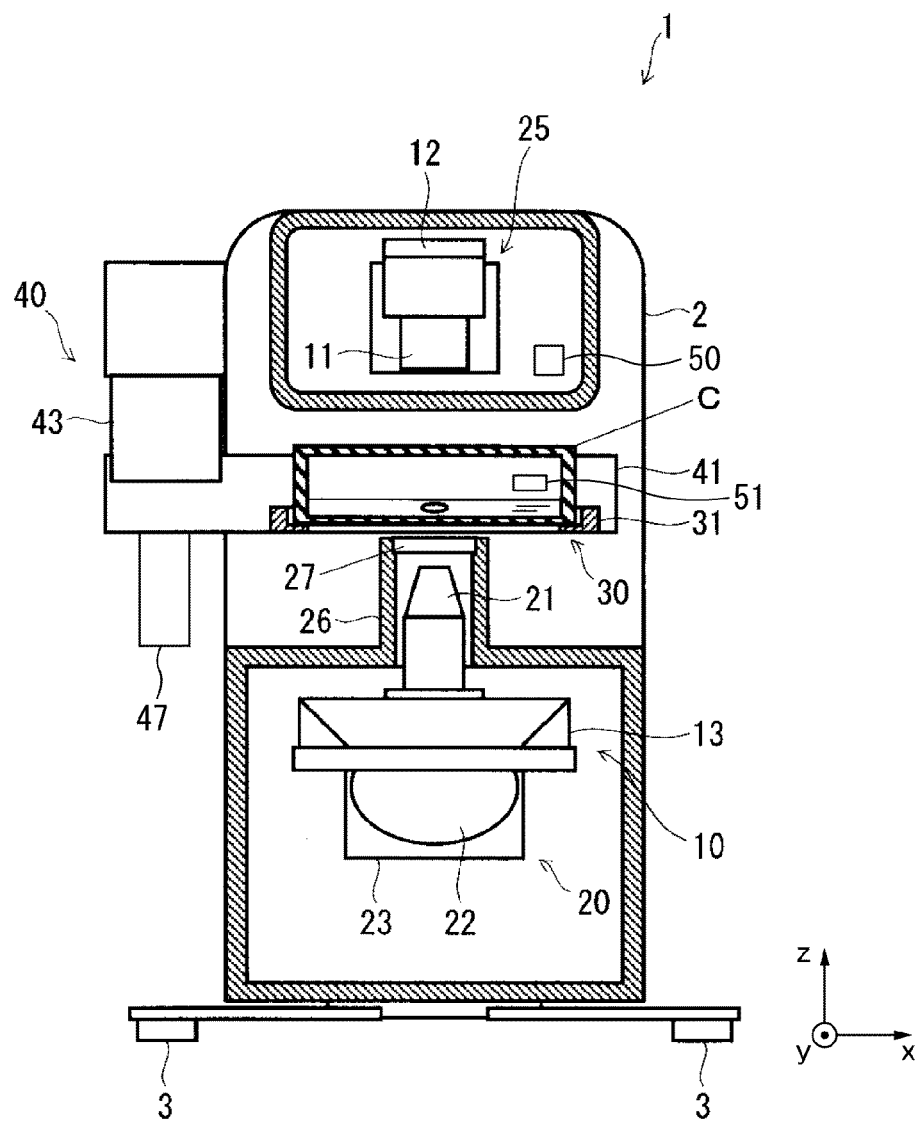
FIG. 3 is an exemplary perpendicular sectional front view of an observation apparatus according to an embodiment of the present disclosure.
Figure 4:
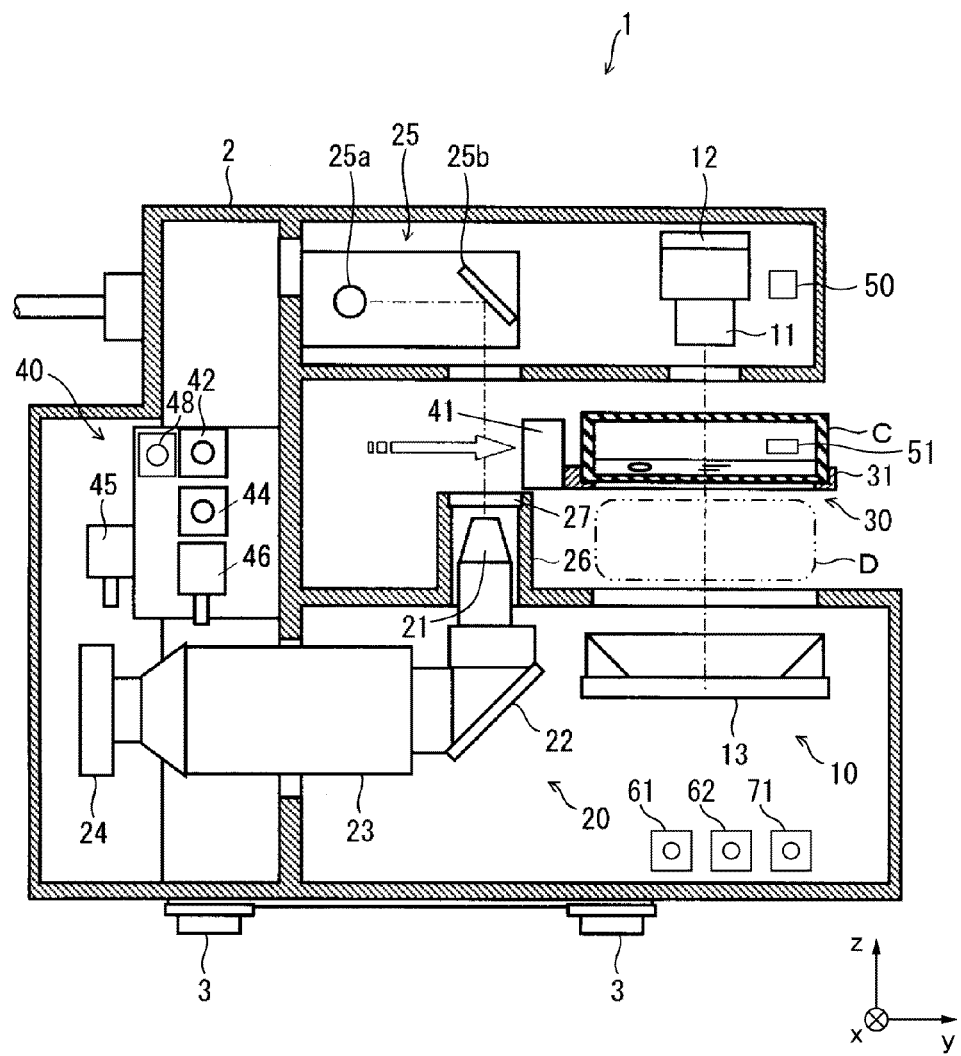
FIG. 4 is an exemplary perpendicular sectional side view of an observation apparatus according to an embodiment of the present disclosure and illustrates a state in which a container has been moved to a spot corresponding to a macro observation unit.
Figure 5:
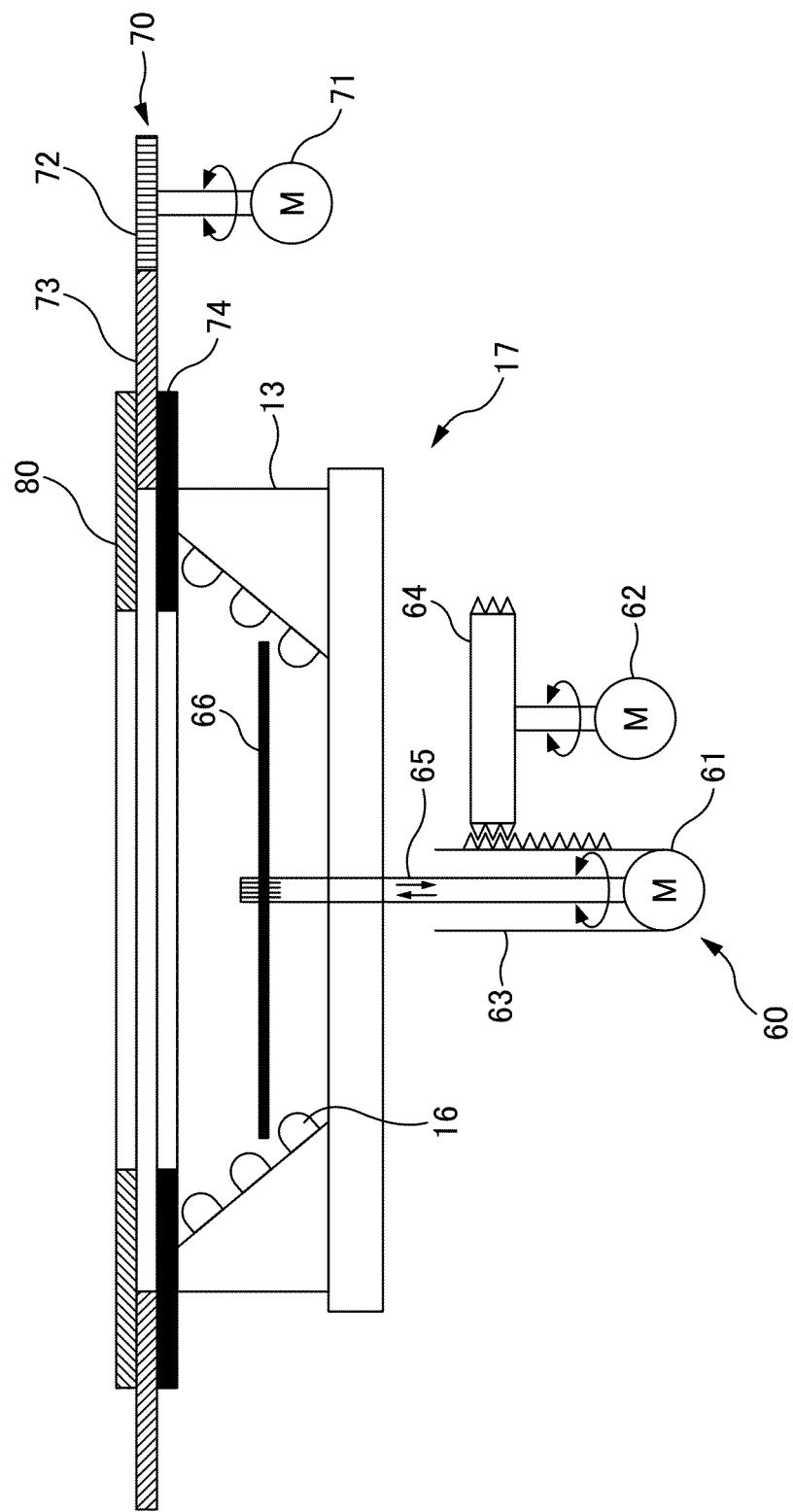
FIG. 5 is an exemplary diagram of a ring illumination, an outer diameter light-shielding plate drive mechanism, an inner diameter light-shielding plate drive mechanism, and a diffusion plate according to an embodiment of the present disclosure.
Figure 6:
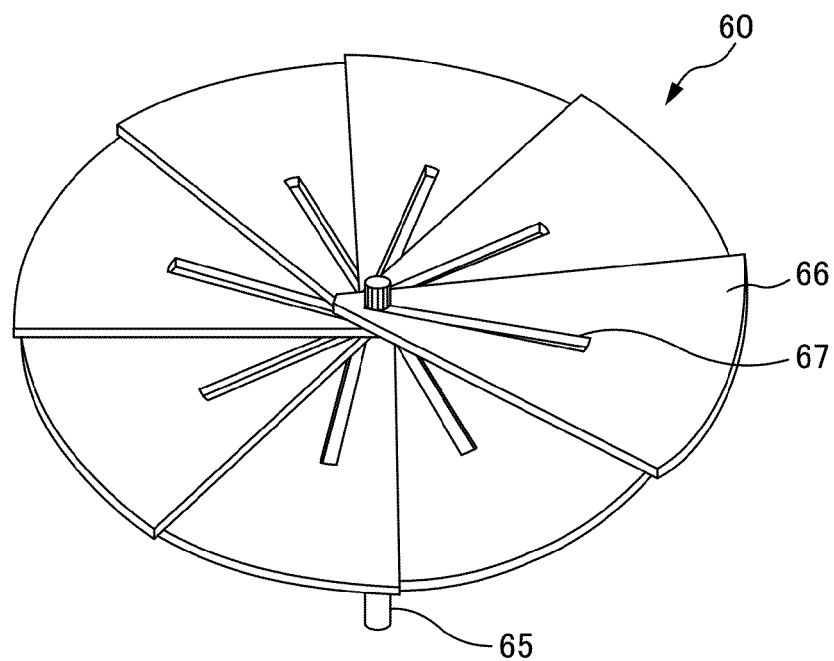
FIG. 6 is an exemplary diagram of an inner diameter light-shielding plate according to an embodiment of the present disclosure.
Figure 7:
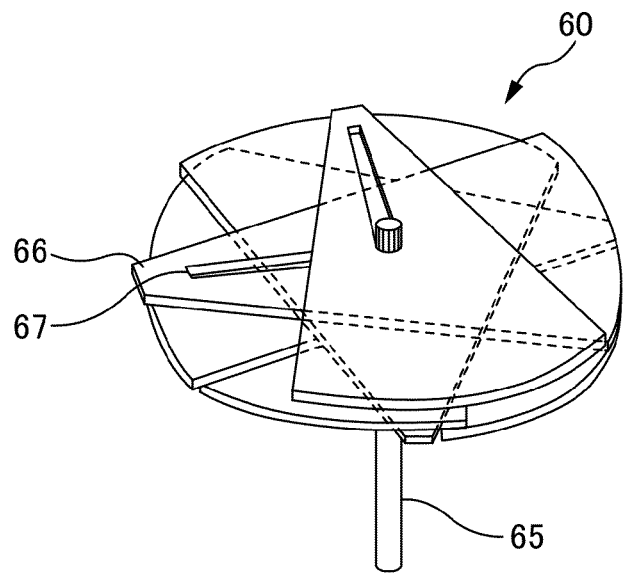
FIG. 7 is an exemplary diagram of an inner diameter light-shielding plate according to an embodiment of the present disclosure.
Figure 8:
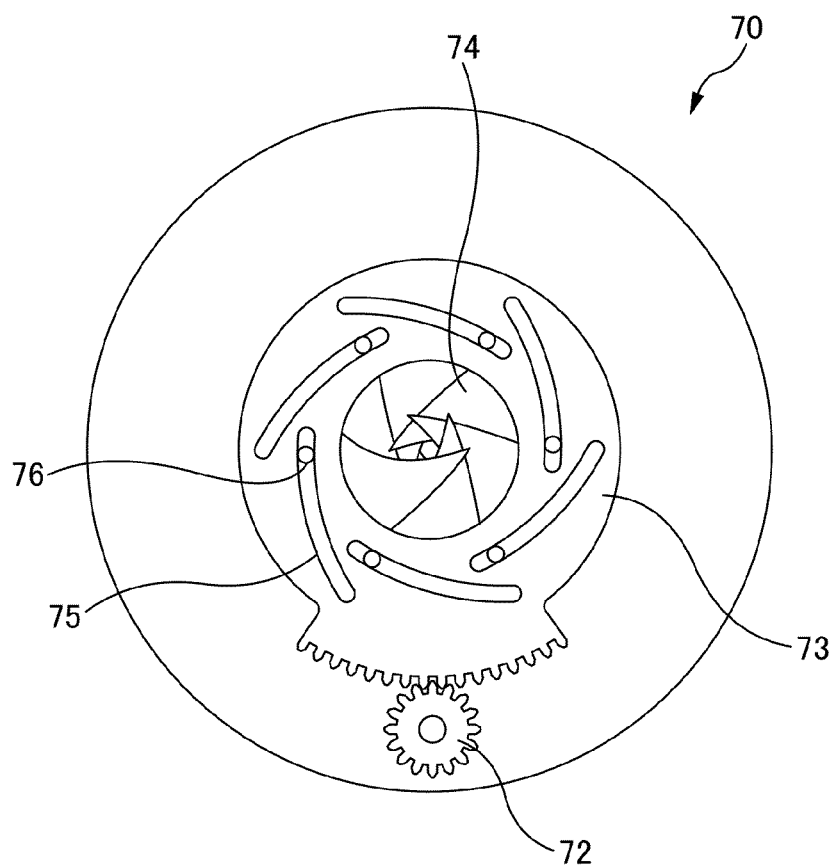
FIG. 8 is an exemplary diagram of an outer diameter light-shielding plate according to an embodiment of the present disclosure.
Figure 9:
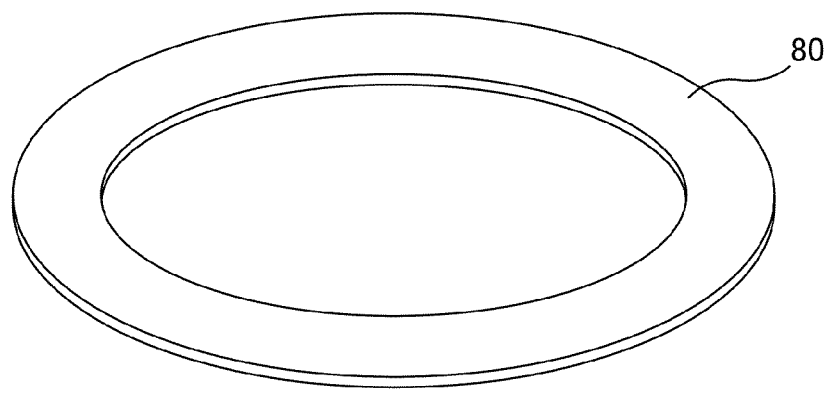
FIG. 9 is an exemplary diagram of a diffusion plate according to an embodiment of the present disclosure.
Figure 10:
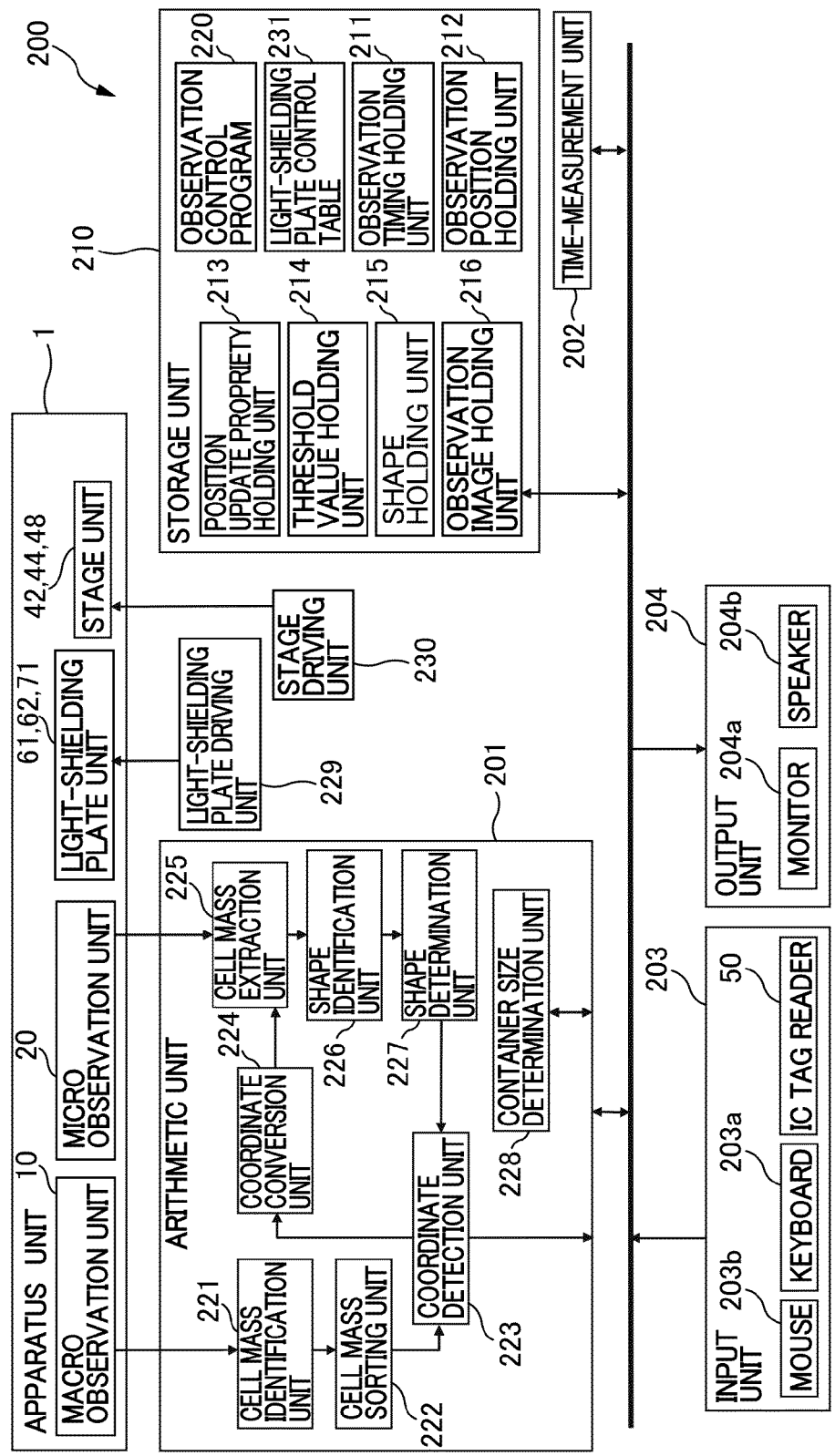
FIG. 10 is an exemplary block diagram of a configuration of a computer according to an embodiment of the present disclosure.

An observation system S according to a first embodiment of the present disclosure will be described with reference to FIGS. 1 to 11. FIG. 1 is a general configuration diagram illustrating the observation system S, FIG. 2 is a perpendicular sectional side view illustrating an observation apparatus 1 included in the observation system S, FIG. 3 is a perpendicular sectional front view illustrating the observation apparatus 1, FIG. 4 is a perpendicular sectional side view illustrating the observation apparatus 1, and FIG. 5 is a diagram illustrating an illumination unit 17. FIGS. 6 and 7 are diagrams illustrating an inner diameter light-shielding plate drive mechanism 60. FIG. 8 is a diagram illustrating an outer diameter light-shielding plate drive mechanism 70. FIG. 9 is a diagram illustrating a diffusion plate 80. FIG. 10 is a block diagram illustrating a configuration of a computer 200 included in the observation system S. FIG. 11 is a diagram illustrating a light-shielding plate control table.

As illustrated in FIG. 1, the observation system S includes, for example, the observation apparatus 1, a control device 100, and the computer 200. Further, in FIG. 1, constituent elements, built in the observation apparatus 1 and not seen from the outside, are indicated by a broken line.

Note that, in the following description, it is assumed that, when the observation apparatus 1 is seen from the front, a direction from the left side surface to the right side surface of the observation apparatus 1 is the +x-axis direction; a direction from the rear to the front of the observation apparatus 1 is the +y-axis direction; and a direction from a bottom surface to a top surface of the observation apparatus 1 is the +z-axis direction.

Therefore, FIG. 1 illustrates the left side surface portion of the observation apparatus 1.

<Observation Apparatus>

Although the details will be described later, the observation apparatus 1 is a device including: a macro (entire) observation unit 10 configured to pick up an image of an entire sample such as a cell contained in a container C; a micro (magnifying) observation unit 20 configured to magnify and pick up an image of a part of the sample in the container C; a conveying unit 30 on which the container C is to be placed; a driving unit 40 configured to move the conveying unit 30 in the x-axis direction, the y-axis direction, and the z-axis direction; and an IC tag reader 50.

The observation apparatus 1 according to an embodiment of the present disclosure, which illuminates the container C from below using a ring illumination 13, described later and picks up an image of the entire container C from above using a CMOS camera 12 when an image of the entire container C is picked up by the macro observation unit 10, is configured such that the ring illumination 13 is provided with an inner diameter light-shielding plate (also referred to as a second light-shielding plate) 66, an outer diameter light-shielding plate (also referred to as a first light-shielding plate) 74, and a diffusion plate 80, and also a distance between the container C and the ring illumination 13 is appropriately controlled, thereby causing the bottom surface of the container C to have uniform brightness. Details will be described later.

<Computer>

The computer 200 is a device configured to control the entire of the observation system S. The computer 200 is a device including a CPU (Central Processing Unit) and memory, and is configured to control the observation system S according to an embodiment of the present disclosure by executing an observation control program 220 (program) which will be described later.

Although the details will be described later, a sample such as a cell cultured in the container C is imaged by using the observation apparatus 1 every predetermined period of time, for example, once a day. The computer 200 first instructs the observation apparatus 1 to pick up an image of the whole of the container C placed on the conveying unit 30. Then, the computer 200 acquires from the observation apparatus 1 an image (macro observation image) acquired by picking up an image of this entire container C, and performs a predetermined image analysis, thereby identifying a location of a cell mass which is being formed in the container C.

Then, the computer 200 specifies the location of each cell mass identified as above and causes the observation apparatus 1 to magnify and pick up an image of a part of each cell mass. The computer 200 acquires from the observation apparatus 1 an image (magnified observation image) acquired by magnifying and picking up an image of each cell mass, and displays it on a monitor 204a, records it in a storage device such as a hard disk device, determines the state of the cell mass, and/or the like.

As such, the processes of identification of the cell mass formed in the container C, magnified observation of the identified cell mass, determination of a state of the cell mass and the like are performed on the basis of the macro observation image of the container C, and thus acquiring the macro observation image of a high quality is extremely important in order to observe a cell with high accuracy.

<Control Device>

The control device 100 is a device configured to acquire various commands outputted from the computer 200 in order to control the observation apparatus 1, and control the macro observation unit 10, the micro observation unit 20, the driving unit 40, and the IC tag reader 50, and the like, of the observation apparatus 1. The control device 100 includes a driver and a controller, not depicted, for driving the observation apparatus 1.

Note that a configuration may be such that, for example, the computer 200 or the observation apparatus 1 includes a function of the control device 100 as well and the observation system S does not include the control device 100. Further, a configuration may be such that, for example, the observation apparatus 1 includes functions of the control device 100 and the computer 200 as well and the observation system S does not include the control device 100 or the computer 200.

<Container C>

The container C is a container made of transparent resin, for example, formed having a circular bottom surface and a side surface surrounding the bottom surface, for example. The container C is attached with an IC tag 51, for example, on the side surface thereof, the IC tag having identification information of the container C recorded therein, or the like. Note that a label, on which a barcode indicating the identification information of the container C is printed, may be attached on the side surface of the container C. The identification information of the container C is read by the IC tag reader 50 of the observation apparatus 1 in response to an instruction from the computer 200.

Note that the container C is provided with a lid so as to prevent contamination from the outside, contamination with other containers, and the like.

==Observation Apparatus==

The observation apparatus 1 will be described in detail.

As illustrated in FIGS. 1 to 9, the observation apparatus 1 includes, in a main body 2 which is a housing thereof, the macro observation unit 10, the micro observation unit 20, the conveying unit (container holding unit) 30, the driving unit 40, and the IC tag reader 50.

The macro observation unit 10 is configured to pick up an image of the entire of the cells in the container C, containing the cells and a culture fluid for the cells, arranged on the conveying unit 30, on the basis of an instruction from the computer 200.

The micro observation unit 20 is configured to magnify and pick up an image of a part of the cells in the container C, containing the cells and a culture fluid for the cells, arranged on the conveying unit 30, on the basis of an instruction from the computer 200.

The conveying unit 30 is configured to hold the container C.

The driving unit 40 is configured to move the conveying unit 30 in the fore-and-aft direction (y-axis direction), the left-and-right direction (x-axis direction), and the up-and-down direction (z-axis direction) and stop it at a desired position on the basis of an instruction from the computer 200.

The main body 2 is supported by leg portions 3 provided at four spots with respect to a floor surface.

The IC tag reader 50 is configured to read the identification information of the container C from the IC tag 51 attached to the container C that is placed on the conveying unit 30, on the basis of an instruction from the computer 200.

<Macro Observation Unit>

The macro observation unit 10 is provided at a portion on the front side of the interior of the sealed housing of the main body 2, and includes a lens 11 which corresponds to a macro observation optical system, the CMOS camera 12 which corresponds to an image pickup unit, and a ring illumination 13 which corresponds to a macro observation illumination.

The lens 11 is arranged at a position opposed to an inner bottom surface of the container C held by the conveying unit 30, and is provided so as to be capable of observing a sample mass in the container C illuminated by the ring illumination 13.

The CMOS camera 12 is provided vertically above the lens 11, and is arranged such that an image pickup element surface thereof is directed to the lens 11 provided below.

The ring illumination 13 has such a configuration that a plurality of LEDs 16 aligned in a ring shape are mounted to an inclined surface in a ring shape formed to face inward and diagonally upward, and is arranged below the movement space of the conveying unit 30. The ring illumination 13 is fixed to a predetermined position opposed to the outer bottom surface of the container C held by the conveying unit 30 in such a manner that the central axis of the ring illumination 13 is aligned to the central axis of the bottom surface of the container C.

Note that, although a space D is provided between the ring illumination 13 and the container C placed on the conveying unit 30, with the predetermined distance therebetween (see FIG. 4), the observation apparatus 1 according to an embodiment of the present disclosure can control the distance between the bottom surface of the container C placed on the conveying unit 30 and an upper end of the ring illumination 13 by moving the conveying unit 30 in the z-axis direction using a Z-axis drive mechanism 47, which will be described later.

This makes it possible to adjust brightness and uneven brightness of the bottom surface of the container C illuminated from below by the ring illumination 13. Details will be described later.

The ring illumination 13 projects light diagonally upward toward the center of a ring so as to illuminate a cell in the container C which is an observation target on the conveying unit 30 located above the ring illumination 13. Note that each of the CMOS camera 12 and the lens 11 is arranged such that the optical axes thereof are aligned with each other, and the ring illumination 13 is arranged such that the aligned optical axes pass through the center of the ring illumination 13.

With such configuration, an image of the cell in the container C illuminated by the ring illumination 13 is formed on the image pickup element surface of the CMOS camera 12 by the lens 11. The macro observation unit 10 picks up an image (macro observation image) of the entire cells of the container C. This image is sent to the computer 200 and displayed on the monitor 204a and stored in a recording medium such as a hard disk. Thus, observation such as identification and specification of a cell mass formed by a plurality of cells gathering in the container C can be performed easily.

Further, the macro observation unit 10 irradiates the container C, with light, obliquely upward from therebelow, and thus, in the bottom surface of the container C, the light passing through a spot where the cell is present is scattered by the cell, and a part of the scattered light enters the CMOS camera 12 and the cell looks white; whereas the light passing through a spot where no cell is present is not scattered, and the light does not enter the CMOS camera 12 and the cell looks black.

As such, it is possible to project appropriate light to identify the cell emerging and growing in the vicinity of the inner bottom surface of the container C. Then, such a contrast can be acquired, by which the external shape of the cell can be recognized as a white mass. Irradiation of the light from below leads to an effect of preventing the impossibility of the observation due to blown-out highlights of the cell caused by reflected light from the lid of the container C.

<Ring Illumination>

The ring illumination 13 according to an embodiment of the present disclosure will then be described.

As illustrated in FIG. 5, the ring illumination 13 configures the illumination unit 17 together with the inner diameter light-shielding plate drive mechanism 60, the outer diameter light-shielding plate drive mechanism 70, and the diffusion plate 80.

The ring illumination 13 according to an embodiment of the present disclosure is configured such that, for example, 60 white LEDs 16 in each circle are aligned in a circular manner in three rows, on an inclined surface, in a ring shape having the predetermined radius, facing inward and diagonally upward (inner conical surface opened upward). Inside a space surrounded by the circularly aligned LEDs is a void and the inner diameter light-shielding plate (second light-shielding plate) 66, which will be described later, is provided therein. The ring illumination 13 of an embodiment of the present disclosure has, for example, an outer diameter of 100 millimeters, an inner diameter of 70 millimeters, and a height of 22 millimeters.

As described above, in an embodiment of the present disclosure, brightness of the bottom surface of the container C when an image of the whole of the container C is picked up can be controlled by adjusting the height of the conveying unit 30, but brightness and uneven brightness of the bottom surface of the container C can be controlled with higher accuracy by the inner diameter light-shielding plate drive mechanism 60, the outer diameter light-shielding plate drive mechanism 70, and the diffusion plate 80, as will be described in detail below.

The inner diameter light-shielding plate drive mechanism 60 includes the inner diameter light-shielding plate 66, an inner diameter light-shielding plate extending motor 61, an inner diameter light-shielding plate up/down motor 62, a rack 63, a pinion 64, and a support shaft 65. The inner diameter light-shielding plate 66 is configured, substantially in a disk shape, with a plurality of members and its outer diameter and height are variable. The inner diameter light-shielding plate 66 is provided in an interior of the ring illumination 13.

Note that FIG. 6 illustrates the inner diameter light-shielding plate 66 in a state where its diameter is maximized. Further, FIG. 7 illustrates the inner diameter light-shielding plate 66 in a state where its diameter is minimized.

The inner diameter light-shielding plate 66, for example, as illustrated in FIG. 6, is configured with a plurality of sheets of plates each in a substantially fan shape. This fan-shaped plate has a long groove 67 formed in a radial direction. The long groove 67 has a rack gear formed on one side thereof along the radial direction of the fan shape. Each fan-shaped plate is mounted to the support shaft 65 by passing the support shaft 65 through the long groove 65 thereof. On the other hand, the support shaft 65 has a pinion gear formed thereon. Thus, a rotation of the support shaft 65 causes fan-shaped plates of the inner diameter light-shielding plate 66 to move in the radial direction, thereby changing the diameter of the inner diameter light-shielding plate 66.

The inner diameter light-shielding plate extending motor 61 is connected to one end of the support shaft 65 and rotates the support shaft 65 in response to an instruction from the computer 200. The fan-shaped plates of the inner diameter light-shielding plate 66 are mounted to the other end of this support shaft 65. Further, the support shaft 65 is mounted in such a manner that its central axis is aligned to the central axis of the ring illumination 13 and the shaft passes through the center of the ring illumination 13.

The inner diameter light-shielding plate up/down motor 62 is a motor configured to control the height of the inner diameter light-shielding plate 66 in the ring illumination 13. The inner diameter light-shielding plate up/down motor 62 rotates the pinion 64 in accordance with an instruction from the computer 200. On the outer circumferential part of the pinion 64, a pinion gear is formed to engage with a rack gear formed on the rack 63.

Since the inner diameter light-shielding plate up/down motor 62 and the pinion 64 are, as in the case with the ring illumination 13, fixed to the main body 2 of the observation apparatus 1, a rotation of the pinion 64 causes the rack 63 to move, together with the support shaft 65, the inner diameter light-shielding plate extending motor 61, and the inner diameter light-shielding plate 66, in the direction along the central axis of the ring illumination 13 (z-axis direction, up-and-down direction). As such, the height of the inner diameter light-shielding plate 66 in the ring illumination 13 can be controlled.

Note that black alumite (anodized aluminum) treatment is applied to the surface of the inner diameter light-shielding plate 66. Thus, the surface of the inner diameter light-shielding plate 66 absorbs the light from the ring illumination 70 without causing irregular reflections and the like, thereby being able to securely shield light.

The outer diameter light-shielding plate drive mechanism 70 includes a ring-shaped outer diameter light-shielding plate (first light-shielding plate) 74 configured to have a variable inner diameter, and is provided between the ring illumination 13 and the conveying unit 30. The outer diameter light-shielding plate drive mechanism 70 is provided to be fixed at the position at which the central axis of a circular opening formed by the outer diameter light-shielding plate 74 coincides with the central axis of the ring illumination 13.

The outer diameter light-shielding plate drive mechanism 70, as illustrated in FIG. 5, includes a drive ring rotating motor 71, a drive ring rotating gear 72, a drive ring 73, the outer diameter light-shielding plate 74, a groove 75, and a pin 76. The configuration of the outer diameter light-shielding plate drive mechanism 70 will be described with reference to FIGS. 5 and 8.

The drive ring rotating motor 71 rotates the drive ring rotating gear 72 in accordance with an instruction from the computer 200. A gear is formed on the outer circumferential part of the drive ring rotating gear 72, and as illustrated in FIG. 8, engages with the gear formed on the drive ring 73. Thus, when the drive ring rotating gear 72 is rotated by the drive ring rotating motor 71, the drive ring 73 rotates.

As illustrated in FIG. 8, the drive ring 73 has a plurality of grooves 75 formed in a spiral direction. Then, the pins 76 formed on diaphragm blades constituting the outer diameter light-shielding plate 74 are fitted to these grooves 75, respectively. The diaphragm blades of the outer diameter light-shielding plate 74 are caused not to move in a direction other than the radial direction by a predetermined regulating mechanism not depicted.

Therefore, when the drive ring 73 rotates, the diaphragm blades, together with the pins 76 of the diaphragm blades engaging with the grooves 75 formed in the spiral direction on the drive ring 73, move in the radial direction, thereby changing the inner diameter of the outer diameter light-shielding plate 74 configured with these diaphragm blades.

Note that the black alumite treatment is applied to the surface of the outer diameter light-shielding plate 74. Thus, the surface of the outer diameter light-shielding plate 74 absorbs light from the ring illumination 70 without causing irregular reflections and the like, thereby being able to securely shield light.

As illustrated in FIGS. 5 and 9, the diffusion plate 80 is a plate in a ring shape. The diffusion plate 80 is translucent and diffuses light applied from the ring illumination 13. The diffusion plate 80 is arranged between the outer diameter light-shielding plate 74 and the conveying unit 30 in such a manner that the central axis of the diffusion plate 80 is aligned to that of the ring illumination 13.

The diffusion plate 80 may be configured by using translucent resin or glass as a material, may be configured by applying a process of altering the surface of transparent resin or glass to achieve a minute uneven surface, or may be configured by affixing a translucent film to the surface of the transparent resin or glass. Further, the diffusion plate 80 may be configured by applying a process of spraying transparent particles to the surface of the transparent resin or glass, and the like.

<Micro Observation Unit>

The micro observation unit 20 is a so-called phase-contrast microscope, provided in the rear of the macro observation unit 10 in the interior of the sealed housing of the main body 2, and includes: a micro observation optical system, such as an objective lens 21, a reflective mirror 22, and a zoom lens 23; a CCD camera 24 which corresponds to an image pickup unit; and a phase-contrast illumination unit 25 which corresponds to a micro observation illumination.

The objective lens 21 is arranged below the movement space of the conveying unit 30, and is provided so as to be capable of observing upward the interior of the container C. Note that, in the periphery of the objective lens 21 which is a lens unit closest to the bottom surface of the container C, an objective lens cover 26 is provided which is a cover member configured to protect the container C from the influence of the heat generated in the lower part of the main body 2. Further, a window unit 27 is provided at an end of the upper part of the objective lens cover 26 and a place between the objective lens 21 and the container C.

The reflective mirror 22 is arranged below the objective lens 21, and provided with such an inclination as to reflect light substantially horizontally backward. The reflective mirror 22 is configured to guide an image acquired from the objective lens 21 to the zoom lens 23 at the rear.

The zoom lens 23 is arranged in such a manner as to extend in the fore-and-aft direction (y-axis direction) to the rear of the reflective mirror 22, and is configured to magnify an image acquired from the objective lens 21.

The CCD camera 24 is provided in the further rear of the zoom lens 23, and is arranged such that an image pickup element surface thereof is directed toward the zoom lens 23 in the front.

The phase-contrast illumination unit 25 is provided in the upper part of the main body 2, and includes an LED 25a and a reflective mirror 25b. The LED 25a is configured to irradiate, with light, the cell to be observed in the container C on the conveying unit 30 that is located below the phase-contrast illumination unit 25. The reflective mirror 25b is arranged vertically above the objective lens 21, and is configured to reflect light so that the light projected by the LED 25a reaches the objective lens 21 through the container C.

With such configuration, an image of the cell in the container C irradiated by the phase-contrast illumination unit 25 is formed on the image pickup element surface of the CCD camera 24 by the objective lens 21, the reflective mirror 22, and the zoom lens 23. Then, the micro observation unit 20 magnifies and picks up an image of the cell in a part of an area of the container C. This image is sent to the computer 200 to be displayed on the monitor 204a, and stored in the recording medium. Thus, identification and specification of a cell mass formed by gathering of a plurality of cells in the container C can be performed easily.

Further, since the relatively heavy micro observation optical system, including a plurality of the lenses and the zoom mechanism thereof for magnifying and observing a cell, is arranged in the lower part, an appropriate weight balance of the observation apparatus 1 is provided, thereby being able to carry out stable micro observation. Further, the objective lens 21 can be brought closer, from below the container C, toward a cell which emerges and grows in the vicinity of the inner bottom surface of the container C, thereby being able to reduce a focal length and observe the cell at relatively great magnification. Further, the observation is carried out from below the container C in the micro observation unit 20, thereby being able to carry out the observation without being affected by stains on the lid of the container C.

<Conveying Unit>

The conveying unit 30 is provided at the front center part of the main body 2, in such a manner as to be sandwiched by: the ring illumination 13 of the macro observation unit 10 and the micro observation optical system of the micro observation unit 20, which are arranged below; and the macro observation optical system of the macro observation unit 10 and the phase-contrast illumination unit 25 of the micro observation unit 20, which are arranged above.

The conveying unit 30 includes a holder 31, and this holder 31 holds the container C containing the cells to be observed and the culture fluid for the cells. The holder 31 is positioned with respect to the macro observation unit 10 and the micro observation unit 20, and the container C is positioned with respect to the holder 31. As a result, even if the container C and the holder 31 are removed together and the culture fluid is replaced or a reagent is charged, the same spot can be easily observed both in the macro observation unit 10 and the micro observation unit 20.

<Driving Unit>

The driving unit 40 is provided in the rear and side of the conveying unit 30, and includes an x-axis drive mechanism 41, an x-axis motor 42, a y-axis drive mechanism 43, a y-axis motor 44, a z-axis drive mechanism 47, a z-axis motor 48, an optical system moving motor 45, and a zoom motor 46.

The x-axis drive mechanism 41 is arranged immediately rear of the conveying unit 30 and is configured to also directly support the conveying unit 30. The x-axis drive mechanism 41, including a belt, a pulley, a slide guide member, a shaft, and the like, not depicted, is driven by the x-axis motor 42, and moves the conveying unit 30 in the left-and-right direction.

The y-axis drive mechanism 43 is arranged in a place on the side surfaces of the conveying unit 30 and the main body 2, and is configured to support the x-axis drive mechanism 41. The y-axis drive mechanism 43, including a belt, a pulley, a slide guide member, and the like, not depicted, is driven by the y-axis motor 44, and moves the conveying unit 30 in the fore-and-aft direction together with the x-axis drive mechanism 41 (See FIG. 4).

The z-axis drive mechanism 47 is arranged in a place on the side surface of the main body 2, and is configured to support the x-axis drive mechanism 41 and the y-axis drive mechanism 43. The z-axis drive mechanism 47, including a belt, a pulley, and a slide guide member, and the like, not depicted, is driven by the z-axis motor 48, and moves the conveying unit 30 in the up-and-down direction together with the x-axis drive mechanism 41 and the y-axis drive mechanism 43.

The operations of such drive mechanisms cause the conveying unit 30 to convey the container C from the macro observation unit 10 to the micro observation unit 20 or in the opposite direction. Since the container C is moved, even if the macro observation unit 10 and the micro observation unit 20 are arranged at places far from each other, it is made possible to observe the whole container C and identify an emerging cell mass, and further magnify and observe this identified cell mass in detail.

Further, the conveying unit 30 is configured to convey the container C in a direction orthogonal to the optical axis direction of the macro observation unit 10 and the micro observation unit 20 as described above, and at least one direction, i.e., the fore-and-aft direction, out of the conveying directions is made common therebetween, thereby causing the coordinates in the observation field of view in the macro observation unit 10 to coincide with the coordinates in the observation field of view in the micro observation unit 20.

Thus, the coordinates in the observation fields of view in the macro observation unit 10 and the micro observation unit 20 coincide with each other, thereby being able to easily identify, using the micro observation unit 20, the cell mass specified through the observation of the whole container C carried out by the macro observation unit 10. Therefore, erroneous identification of a target cell mass is avoided, thereby being able to realize observation with high accuracy.

The optical system moving motor 45 and the zoom motor 46 are arranged in the main body 2 in the rear of the conveying unit 30. The optical system moving motor 45 is a motor configured to move the micro observation optical system and the CCD camera 24 in the up-and-down direction. The zoom motor 46 is a motor configured to change the magnification of the zoom lens 23, and is capable of changing the magnification of an image to be picked up.

<IC Tag Reader>

The IC tag reader 50 is provided, for example, at a part on the front side in the interior of the sealed housing of the main body 2. The IC tag reader 50 is configured to oscillate an electromagnetic wave of a predetermined frequency and read identification information of the container C from a response wave received from the IC tag 51 that is attached to the container C, on the basis of an instruction from the computer 200.

==Computer==

The computer 200 includes an arithmetic unit 201, a storage unit 210, a time-measurement unit 202, an input unit 203, and an output unit 204, as illustrated in FIG. 10.

The arithmetic unit 201 includes a CPU, a microcomputer, and other electronic components, and is realized by, for example, execution of an observation control program 220 stored in the storage unit 210 by the CPU. The arithmetic unit 201 is configured to control a series of observation operations relating to the observation apparatus 1.

The arithmetic unit 201, as illustrated in FIG. 10 as functional blocks, includes a cell mass identification unit 221, a cell mass sorting unit 222, a coordinate detection unit 223, a coordinate conversion unit 224, a cell mass extraction unit 225, a shape identification unit 226, a shape determination unit 227, and a container size determination unit 228.

Note that, the observation control program 220 causes, besides these processing blocks, an macro image-pickup processing of sending an instruction to the macro observation unit 10 of the observation apparatus 1 to pick up an image of the cell by picking up an image of the whole container C, and a micro image-pickup processing of sending an instruction to the micro observation unit 20 to magnify the interior of the container C and pick up an image of the cell, to be executed.

<Cell Mass Identification Unit>

The cell mass identification unit 221 is configured to first convert an image, if it is a color image, into a gray image, and then discriminate, using a predetermined threshold value, between a part that is not a cell mass and a part corresponding to a cell mass in the image picked up through the macro image-pickup processing. As a result, binarization is executed such that the part that is not a cell mass is changed into black and the part corresponding to a cell mass is changed into white. Then, the cell, that is, the number of white pixels is calculated. A method of calculating the number of white pixels includes: a labeling method of calculating a connected area of white pixels; and a small-area method of calculating an area so that the number of white pixels in a predetermined small area at an arbitrary position becomes as great as possible, for example.

The labeling method is a method of identifying a cell mass by the size of a single white-pixel area or the degree of the white-pixel-area density, whereas the small area method is a method of identifying a cell mass by the number of the white pixel areas or the greatness of the number thereof, and the degree of the density. In addition, identification may be made by the degree of isolation of the cell masses (the degree at which individual cell masses exist with a predetermined distance one another). Note that the labeling method is employed herein.

The labeling process is a process of grouping a plurality of pixels by assigning the same number (label) to white pixels (or black pixels) adjacent to each other, with respect to the image subjected to the binarization process. In determination on adjacency in the labeling process, four-connection (four-neighbor) and eight-connection (eight-neighbor) are used. In the four-connection, if a pixel is contiguous to the pixel of attention in the up-and-down or left-and-right direction, they are determined to be adjacent, whereas in the eight-connection, determination on adjacency is made by further considering contiguousness in additional four diagonal directions. As such, the cell mass identification unit 221 is configured to identify a mass of binarized white pixels, i.e., a cell mass, from an image picked up through the macro image-pickup processing.

Then, the cell mass identification unit 221 is configured to recognize, as a micro observation target cell mass, a cell mass having a size equal to or greater than a predetermined size among identified cell masses. The "predetermined size" indicates a size set in advance for a cell mass, and such a size that can be determined to be observed under magnification. The predetermined size is set here at, for example, 1000 pixels for the number of pixels, and is stored in the storage unit 210. As a result, a cell mass having the number of pixels equal to or greater than 1000 pixels is recognized as a micro observation target cell mass, thereby being able to ascertain the time of emergence of a cell mass. Therefore, it becomes possible to perform continuous observation from the time of emergence of a cell mass to the time of completion of growth thereof.

<Cell Mass Sorting Unit>

The cell mass sorting unit 222 is configured to execute sorting of the cell masses identified by the cell mass identification unit 221, i.e., the masses of white pixels in decreasing order of the number of pixels. Then, a predetermined number of cell masses are selected as observation targets, in decreasing order of the number of pixels, for example.

<Coordinate Detection Unit>

The coordinate detection unit 223 is configured to detect coordinates of the center of a cell mass, i.e., a mass of white pixels, identified by the cell mass identification unit 221 and sorted by the cell mass sorting unit 222.

<Coordinate Conversion Unit>

The coordinate conversion unit 224 is configured to first calculate the coordinates by pixels on an image picked up through the macro image-pickup processing and then convert the coordinates into a real scale with the center of the image set to the origin. Various aberrations such as distortion aberration of the image may be corrected here. Further, the coordinate conversion unit 224 is configured to convert the real scale into the motor pulse numbers of the x-axis motor 42 and the y-axis motor 44 of the driving unit 40 in the observation apparatus 1, so as to be matched with a position on the image expressed by this real scale. As such, the coordinate conversion unit 224 is configured to create a common coordinate system in which the coordinates on the image picked up through the micro image-pickup processing matches the coordinates on the image picked up through the macro image-pickup processing.

<Cell Mass Extraction Unit>

The cell mass extraction unit 225 is configured to extract the cell mass of the coordinates detected by the coordinate detection unit 223 from the image picked up through the micro image-pickup processing.

<Shape Identification Unit>

The shape identification unit 226 is configured to first perform matching of a patch image prepared in advance with an image picked up through the micro image-pickup processing. As a matching result, a range image, which is expressed by shading, between the image picked up through the micro image-pickup processing and the patch image is acquired. The shape identification unit 226 is configured to then execute binarization processing of the range image using a predetermined threshold value. Matching methods include, for example, template matching, histogram matching, and a determination target image, i.e., an image picked up through the micro image-pickup processing, is subjected to raster scan with the patch image, thereby calculating the range therebetween. If a large number of patch images are prepared, the range images of the matching results are integrated. Note that even if a plurality of cell masses are present in the image picked up through the micro image-pickup processing, the shape identification unit 226 can identify each of the cell masses separately.

The shape identification unit 226 is configured to subsequently detect a contour, for example, by executing contour extraction, which is performed with an edge extraction filter, and contour tracing, which is performed through eight-connection search, in an image subjected to the binarization processing. As the edge extraction filter for contour extraction, for example, a differential filter, a Prewitt filter, a Sobel filter, a Canny Edge Detector can be used. In the contour tracing, a contour line can be extracted by tracing contour points sequentially in one direction from a tracing start point of a contour, and four-connection search can be also used.

The shape identification unit 226 is configured to then detect a predetermined shape, such as a circle, an ellipse, a rectangle, from the contour detection results. As a method of detecting a circle from a contour or an edge, Hough transformation can be used. As a method of detecting an ellipse from a contour or an edge, generalized Hough transformation or a method of fitting an ellipse to a sequence of points of a contour using least squares estimation can be used. As a method of detecting a rectangle from a contour or an edge, a method of fitting a rectangle so that all the sequences of points in a contour are included, can be used. As such, the shape identification unit 226 is configured to extract a contour of a cell mass from an image picked up through the micro image-pickup processing and identifies a shape thereof.

<Shape Determination Unit>

The shape determination unit 227 is configured to determine (judge) whether or not the cell mass identified by the shape identification unit 226 has a predetermined shape. The "predetermined shape" is a shape set in advance for a cell mass, and is preferably such a shape that can be determined to have a high possibility of continuously growing in a manner suitable for observation and is close to a circle to the highest degree possible.

As the criteria for judging a cell mass to be of a predetermined shape, for example, criteria such as a size and the degree of unevenness may be added to the shape. The criteria for judging a shape includes, for example, the degree of ellipse of an ellipse surrounding a contour, and roundness of a circle surrounding a contour. The criteria for judging a size includes, for example, a size of a white pixel mass, a length of a contour of a white pixel mass, the area of an interior of a contour of a white pixel mass, a length of a long axis of an ellipse, a length of a short axis of an ellipse, a length of a circumference of an ellipse, a diameter of a circle, a length of a circumference of a circle, a length of a rectangle surrounding a contour, and the area of a rectangle surrounding a contour. The criteria for judging the degree of unevenness includes, for example, the ratio of the area of a contour to a peripheral length, the ratio of the area of a contour to the area of a rectangle surrounding a contour, the ratio of the length of a contour to the length of the rectangle surrounding a contour, the number of corners in a contour, the ratio of the area of a contour to the area of a circle or an ellipse surrounding a contour, the ratio of the length of a contour to the length of a circumference of a circle or a circumference of an ellipse surrounding a contour, the ratio of the area of a rectangle surrounding a contour to the area of a circle or an ellipse surrounding a contour, and the ratio of the length of a rectangle surrounding a contour to the length of a circle or an ellipse surrounding a contour. As a method of corner detection when judgment is made on the basis of the number of corners in a contour, for example, Harris corner detection, SUSAN operator, and the like can be used.

The criteria for judging the predetermined shape of a cell mass is set here, for example, at the degree of ellipse equal to or smaller than 1.1, and is stored in the storage unit 210. Note that the degree of ellipse is the ratio of the long-axis length of the ellipse to the short-axis length thereof. As a result, a cell mass close to a circle to the highest degree possible is identified, thereby being able to automatically select a cell mass having an appropriate shape for continuing observation. Therefore, it becomes possible to lower the observation priority of a cell mass that has grown in a distorted shape during a growing process, or stop the observation thereof, and thus observation of a cell mass having an appropriate shape can proceed more efficiently.

Further, not only a method of explicitly judging a shape by a threshold value (e.g., the degree of ellipse of 1.1), but such a method can be used that cell mass images are sorted on the basis of superiority of determination results and displayed on a monitor 204*a* (in the case of the degree of ellipse, they are displayed in order from the smaller degree of ellipse), thereby leaving, to a user, the determination of the range within which the cell mass is considered suitable.

<Container Size Determination Unit>

The container size determination unit 228 is configured to send an instruction to the IC tag reader 50 of the observation apparatus 1 to read identification information of the container C from the IC tag 51 attached to the container C that is placed on the conveying unit 30.

The container size determination unit 228 is configured to then refer to a light-shielding plate control table 231 (see FIG. 11), which will be described later, and acquire the size of the container C from the read identification information. In an example illustrated in FIG. 11, it is indicated that, in the case of the identification number of 0001, the outer diameter of the container C is 60 millimeters, and in the case of the identification number of 0002, the outer diameter of the container C is 100 millimeters. Note that the light-shielding plate control table 231 will be described later.

Note that a method of acquiring the size of the container C is not limited to the above. For example, when a barcode or a QR code (registered trademark) is attached to the container C, the size of the container C may be acquired on the basis of the identification information read from the barcode or the QR code (registered trademark) by referring to the light-shielding plate control table 231.

Alternatively, the size of the container C may be acquired such that an ultrasonic sensor, an infrared sensor, or a laser sensor is installed inside the observation apparatus 1; the container C is irradiated with ultrasonic waves, infrared light, or laser light from such a sensor; and the shape and the distance of the container C are measured on the basis of reflected waves or light thereof.

Alternatively, a user may input the size of the container C through a keyboard 203*a* of the computer 200. Alternatively, the computer 200 may acquire the size of the container C such that the computer 200 picks up an image of the container C using the macro observation unit 10, and performs image processing such as Hough transformation.

<Light-Shielding Plate Driving Unit> the light-shielding plate driving unit 229 is configured to, when the macro observation of the container C is performed, refer to the light-shielding plate control table 231 (see FIG. 11), and control the inner diameter of the outer diameter light-shielding plate 74 and the outer diameter and the height of the inner diameter light-shielding plate 66, according to the size of the container C determined by the container size determination unit 228.

As described above, the light-shielding plate driving unit 229 is configured to control the outer diameter of the inner diameter light-shielding plate 66 by controlling the inner diameter light-shielding plate extending motor 61, control the height of the inner diameter light-shielding plate 66 by controlling the inner diameter light-shielding plate up/down motor 62, and control the inner diameter of the outer diameter light-shielding plate 74 by controlling the drive ring rotating motor 71.

Note that, in FIG. 10, the inner diameter light-shielding plate extending motor 61, the inner diameter light-shielding plate up/down motor 62, and the drive ring rotating motor 71 are collectively referred to as light-shielding plate unit 61, 62, and 71.

In the light-shielding plate control table 231 in FIG. 11, it is described that, in the case where the outer diameter of the container C is 60 millimeters, the light-shielding plate driving unit 229 controls the inner diameter light-shielding plate extending motor 61, the inner diameter light-shielding plate up/down motor 62, and the drive ring rotating motor 71 so that the inner diameter (A1) of the outer diameter light-shielding plate 74 is 69 millimeters, the outer diameter (B1) of the inner diameter light-shielding plate 66 is a minimum value (MIN), and the height (B2) of the inner diameter light-shielding plate 66 is also a minimum value (MIN). It is also described that, in the case where the outer diameter of the container C is 100 millimeters, the light-shielding plate driving unit 229 controls the inner diameter light-shielding plate extending motor 61, the inner diameter light-shielding plate up/down motor 62, and the drive ring rotating motor 71 so that the inner diameter of the outer diameter light-shielding plate 74 is 114 millimeters, the outer diameter of the inner diameter light-shielding plate 66 is 106 millimeters, and the height of the inner diameter light-shielding plate 66 is 14.3 millimeters.

This makes it possible to adjust brightness and uneven brightness of the bottom surface of the container C illuminated from below by the ring illumination 13. Then, it is made possible to easily perform identification and specification of a cell mass formed by gathering of a plurality of cells in the container C. Further, it is made possible to apply light that is appropriate for specifying the cell which emerges and grows in the vicinity of the inner bottom surface of the container C.

<Stage Driving Unit>

The stage driving unit 230 is configured to control the x-axis motor 42, the y-axis motor 44, and the z-axis motor 48 (hereinafter, also referred to as stage unit) of the observation apparatus 1.

Further, the stage driving unit 230 is configured to, when the macro observation of the container C is performed, refer to the light-shielding plate control table 231 (see FIG. 11), and control the z-axis motor 48, to move the conveying unit 30 in the direction of the central axis of the ring illumination 13, thereby controlling the distance between the conveying unit 30 and the ring illumination 13 (hereinafter also referred to as a height of the conveying unit 30) so as to be a predetermined distance, according to the size of the container C determined by the container size determination unit 228.

In the light-shielding plate control table 231 of FIG. 11, it is described that, when the outer diameter of the container C is 60 millimeters, the stage driving unit 230 controls the z-axis motor 48 so that the height (H) of the conveying unit 30 is 15 millimeters. It is also described that, when the outer diameter of the container C is 100 millimeters, the stage driving unit 230 controls the z-axis motor 48 so that the height (H) of the conveying unit 30 is 24 millimeters.

This makes it possible to adjust brightness and uneven brightness of the bottom surface of the container C illuminated from below by the ring illumination 13. Then, it is made possible to easily perform identification and specification of a cell mass formed by gathering of a plurality of cells in the container C. Further, it is made possible to apply light that is appropriate for specifying a cell which emerges and grows in the vicinity of the inner bottom surface of the container C.

<Storage Unit>

The storage unit 210 is configured to store various types of data relating to observation of a cell and an operation of the observation system S. The storage unit 210 is configured with, for example, a hard disk device and semiconductor memory.

The storage unit 210 includes, for example, the light-shielding plate control table 231, an observation timing holding unit 211, an observation position holding unit 212, a position updating propriety holding unit 213, a threshold value holding unit 214, a shape holding unit 215, and an observation image holding unit 216.

In the light-shielding plate control table 231, there are described the target values when the light-shielding plate driving unit 229 and the stage driving unit 230 control the inner diameter (A1 or also referred to as first parameter) of the outer diameter light-shielding plate 74; the outer diameter (B1 or also referred to as third parameter) of the inner diameter light-shielding plate 66; the height (B2 or also referred to as second parameter) thereof, that is to say, the distance between the bottom surface of the ring illumination 13 and the inner diameter light-shielding plate 66; and the height (H, or also referred to as fourth parameter) of the conveying unit 30, that is to say, the distance between the top surface of the ring illumination 13 and the outer bottom surface of the container C, in the case where the macro observation of the container C is carried out. These target values are set to optimal values, respectively, so that brightness of the bottom surface of the container C illuminated by the ring illumination 13 is uniform, according to the size of the container C. The light-shielding plate control table 231 is depicted in FIG. 11.

The observation timing holding unit 211 is configured to hold various types of data relating to date and time such as a time period, the number of days, and a time limit associated with the observation. These are data such as, for example, a "predetermined identification time period", which is a predetermined time period relating to the identification of the cell mass, set with respect to the timing of executing the identification of the cell mass as a macro observation target, a "predetermined number of days for identification", which is a predetermined number of days, set with respect to the timing of finishing the identification of the cell mass as a macro observation target, a "predetermined image pickup time period", which is a predetermined time period relating to the pickup of the magnified image, set with respect to the timing of executing the magnified image pickup of the cell mass, and a "predetermined observation time limit", which is a predetermined time limit, preset with respect to the timing of finishing the observation of the cell. These data are appropriately used as criteria for judgment in the observation control program 220 and are compared with the dates and times measured by the time-measurement unit 202.

The observation position holding unit 212 is configured to hold data such as the observation position (coordinates) of the cell mass acquired through the macro observation and the observation position (coordinates) set manually.

The position updating propriety holding unit 213 is configured to hold a flag indicative of whether to update the observation position of the cell mass acquired at the time of the previous macro observation and stored in the observation position holding unit 212, depending on the predetermined identification time period stored in the observation timing holding unit 211.

The threshold value holding unit 214 is configured to hold various data relating to the threshold values associated with the observation. These are data such as, for example, the threshold value for judging whether the pixel is the white pixel or the black pixel at the time of the binarization processing, and the threshold value with respect to the number of pixels for judging whether to extract the labeled mass of white pixels as the cell mass.

Further, the threshold value holding unit 214 holds the threshold values for identifying the cell mass capable of ideally growing when the shape identification processing is executed. These are data such as, for example, the threshold value of the number of pixels for judging the size of the white pixel mass, the threshold value of the length of the contour for judging by the length of the contour of the white pixel mass, the threshold value of the area for judging by the area of the interior of the contour of the white pixel mass, the threshold value of the roundness for judging by the roundness of the circle surrounding the contour, the threshold value of the ratio between the long axis and the short axis of the ellipse for judging by the degree of ellipse of the ellipse surrounding the contour, the threshold value of the diameter for judging by the diameter of the circle, the threshold value of the circumference of the circle for judging by the length of the circumference of the circle, the threshold value of the long axis for judging by the length of the long axis of the ellipse, the threshold value of the short axis for judging by the length of the short axis of the ellipse, the threshold value of the circumference of the ellipse for judging by the length of the circumference of the ellipse, the threshold value of the length of the rectangle for judging by the length of the rectangle surrounding the contour, the threshold value of the area of the rectangle for judging by the area of the rectangle surrounding the contour, the threshold value of the ratio between the area and the peripheral length of the contour for judging by the ratio between the area and the peripheral length of the contour, the threshold value of the area ratio for judging by the ratio between the area of the contour and the area of the rectangle surrounding the contour, the threshold value of the length ratio for judging by the ratio between the length of the contour and the length of the rectangle surrounding the contour, the threshold value of the number of corners for judging by the number of corners in the contour, the threshold value of the area ratio for judging by the ratio between the area of the contour and the area of the circle or the ellipse surrounding the contour, the threshold value of the length ratio for judging by the ratio between the length of the contour and the length of the circumference of the circle or the ellipse surrounding the contour, the threshold value of the area ratio for judging by the ratio between the area of the rectangle surrounding the contour and the area of the circle or the ellipse surrounding the contour, and the threshold value of the length ratio for judging by the ratio between the length of the rectangle surrounding the contour and the length of the circle or the ellipse surrounding the contour.

The shape holding unit 215 is configured to hold results of the shape identification processing of the cell mass, with respect to all methods of the shape identification processing.

The observation image holding unit 216 is configured to hold the magnified observation images and the macro observation images.

Note that the observation timing holding unit 211 and the threshold value holding unit 214 is configured to function also as setting units by which the user can change various settings relating to the observation control program 220 as appropriate. Items settable by using the observation timing holding unit 211 include: setting items such as, for example, the timing of picking up the image in the macro observation unit 10 or the micro observation unit 20; and the time period, the number of days, and the time limit associated with the observation. Items settable by using the threshold value holding unit 214 include: setting items such as, for example, the predetermined size of the cell mass as the criteria for judging the cell mass to be subjected to the micro observation; and the predetermined shape of the cell mass as the criteria for judging whether the cell mass has a shape suitable for continuing observation.

<Time-Measurement Unit>

The time-measurement unit 202 is configured to measure a period of time and days from the start of observation of a cell, a time relating to operation control of the observation system S, and the like, thereby being able to grasp various types of time.

<Input Unit>

The input unit 203 includes, for example, pointing devices such as a keyboard 203a and a mouse 203b; and the IC tag reader 50. The user inputs characters and numerical values by using the keyboard 203a. Further, the user moves a cursor in an arbitrary direction on a screen of the monitor 204a of the output unit 204 by using the mouse 203b, and selects a menu or other options. The arithmetic unit 201 is configured to execute various types of processing to a program, data, and a file stored/inputted in/to the arithmetic unit 201 and the storage unit 210, on the basis of information acquired from the input unit 203, and execute an output process to the output unit 204.

<Output Unit>

The output unit 204 includes, for example, the monitor 204a such as a liquid crystal display and a CRT; and a speaker 204b. The arithmetic unit 201 is configured to cause a window, an icon, and a menu to be displayed on the monitor 204a on the basis of the processing of a program to be executed, and cause sound to be emitted from the speaker 204b. Further, the arithmetic unit 201 is configured to cause characters and numerical values inputted by the user to be displayed on the monitor 204a on the basis of the information from the input unit 203, and cause a cursor, which is to be moved by the user, to be displayed.

==Process Flow==

<Operation Flow>

Figure 12:
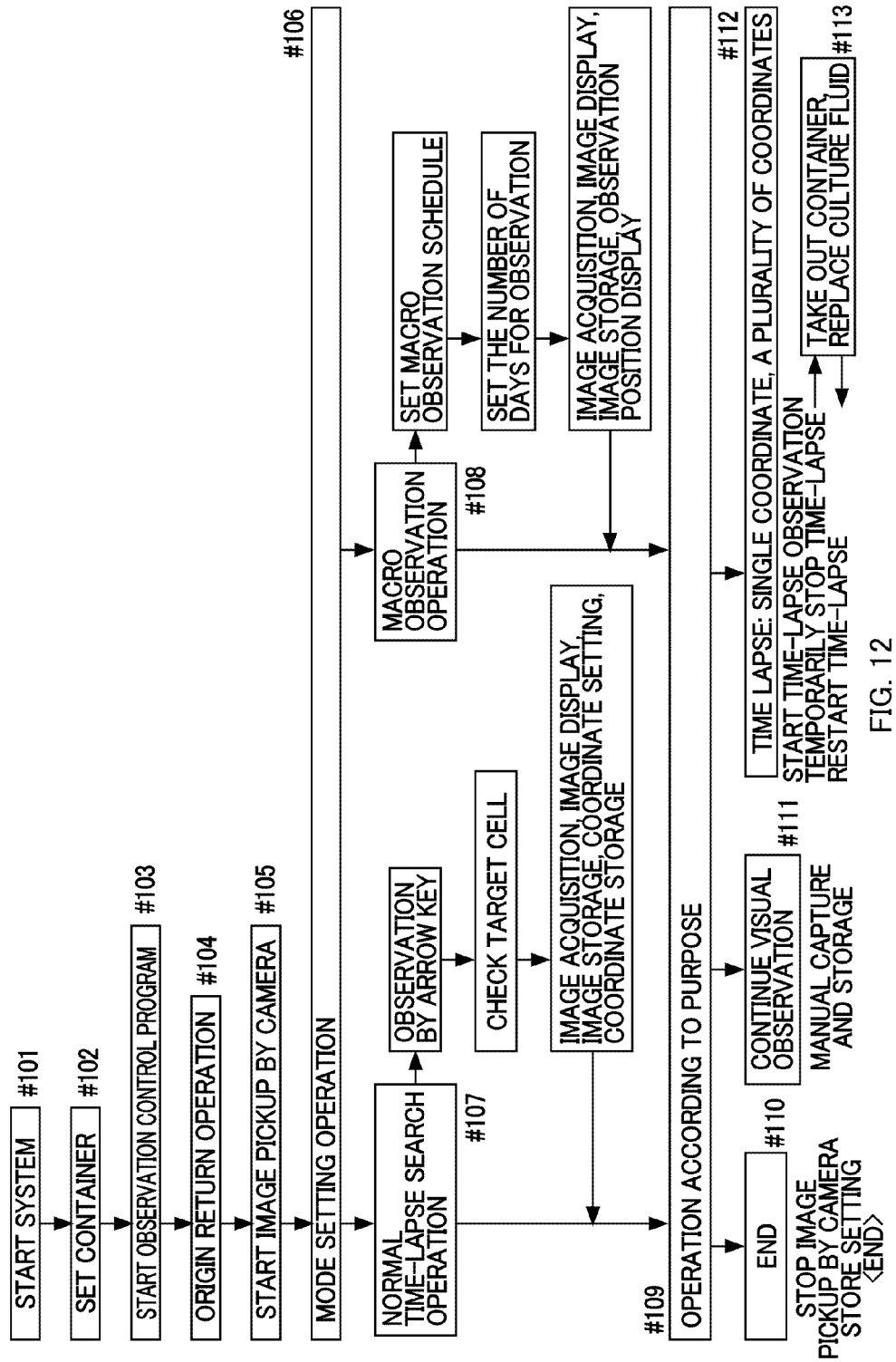
FIG. 12 is an exemplary explanatory diagram of a flow associated with an operation of an observation system according to an embodiment of the present disclosure.

Subsequently, an operation of the observation system S performed by the user relating to observation of a cell in the container C will be described along a flow illustrated in FIG. 12. FIG. 12 is an explanatory diagram illustrating the flow relating to an operation of the observation system S.

The user first turns on the observation apparatus 1, the control device 100, and the computer 200, thereby starting the observation system S (Step #101 in FIG. 12). Then, the user sets the container C containing a cell and a culture fluid for the cell on the holder 31 of the conveying unit 30 (Step #102). Subsequently, the user starts the observation control program 220 in the computer 200 (Step #103), thereby displaying an operation screen on the monitor 204a.

The observation control program 220 causes an origin return operation of the conveying unit 30 to be automatically performed together with startup of the program (Step #104). Then, the observation control program 220 causes picking up of an image with a camera to be started (Step #105), and causes a real-time image from the camera to be displayed on the monitor 204a.

Subsequently, the user executes a mode setting operation (Step #106). In this mode setting operation, it is possible to select between a normal time-lapse search operation (Step #107) and a macro observation operation (Step #108). The time lapse observation is a method of observing a position, set in advance, in every predetermined time period.

In the normal time-lapse search operation (Step #107), the user observes the interior of the container C while moving the container C using an arrow key on the monitor 204a or the keyboard 203a, and checks a target cell. Then, the user executes acquisition, display and storage of a captured image, and further executes setting of the coordinates and storage of the coordinates.

In the macro observation operation (Step #108), the user sets the predetermined identification time period and the predetermined number of days for identification, in the macro observation. The acquisition, display and storage of an image and further the observation position display are automatically executed on the basis of the setting.

Subsequently, in an operation according to purpose (Step #109), it is possible to select from operations of end (Step #110); continuation of visual observation (Step #111); and time lapse (Step #112).

If the end (step #110) is selected, the image pickup by camera is stopped, and the setting is stored. If the continuation of visual observation (Step #111) is selected, it is possible to manually capture and store an image picked up by the camera.

If the time-lapse (Step #112) is selected, operations of starting the time-lapse observation, temporarily stopping time-lapse, and restarting time-lapse can be further performed. If the time lapse is temporarily stopped, works such as taking-out of the container C, replacing of the culture fluid can be performed (Step #113).

Performing the time-lapse observation using such observation control program 220 enables automatic execution of such a series of processes that a cell mass having emerged is identified in an image picked up in the macro image-pickup processing, and the position thereof is specified; and further a shape of the cell mass is identified from an image picked up in the micro image-pickup processing, and a cell mass in an appropriate shape for continuing the observation is selected.

<Flow of Control by Observation System>

Figure 13:
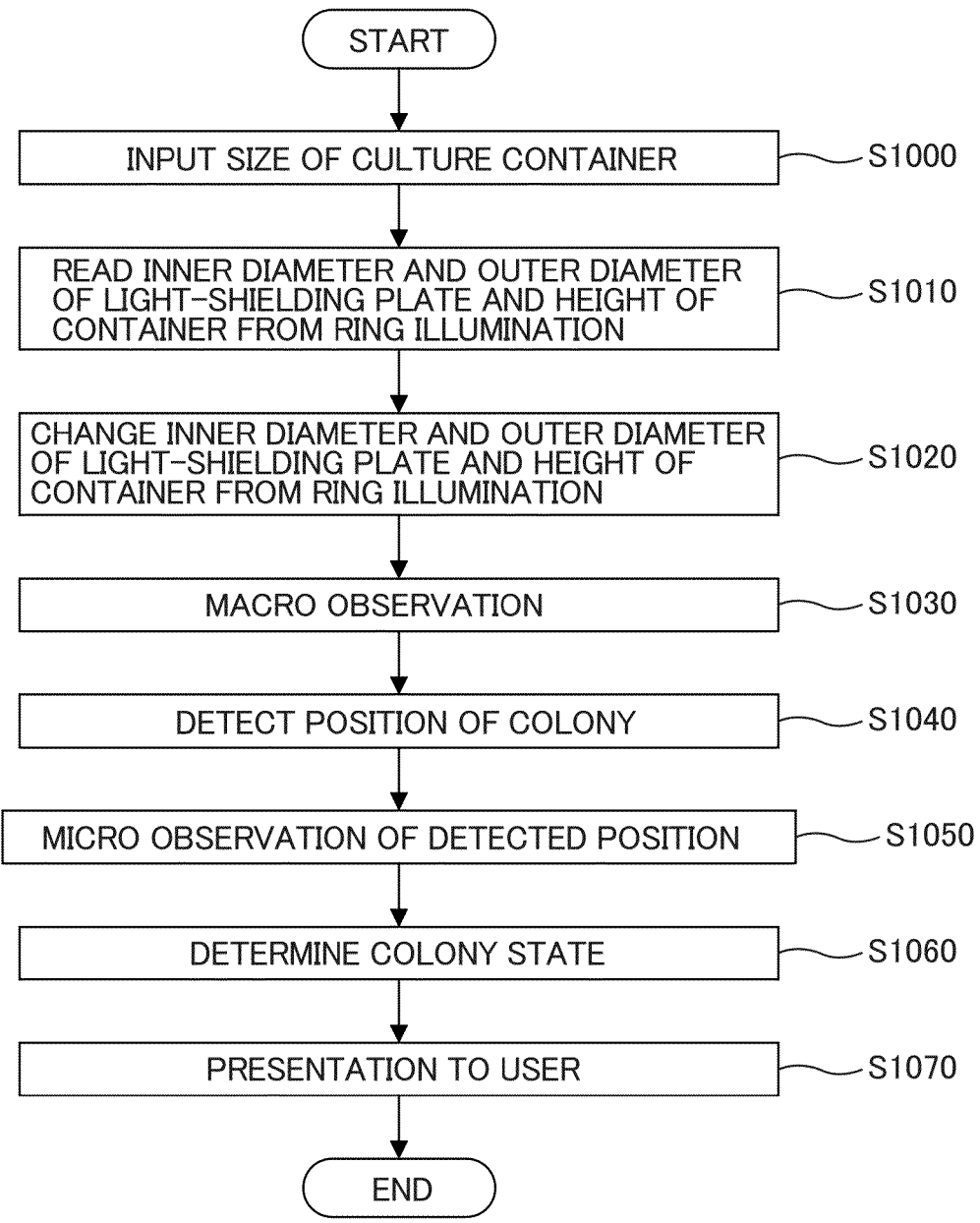
FIG. 13 is an exemplary flowchart of an operation associated with an observation process in an observation system according to an embodiment of the present disclosure.

Subsequently, a flow of control performed by the observation system S according to an embodiment of the present disclosure will be described with reference to a flowchart illustrated in FIG. 13.

The observation system S first accepts an input of the size of the container C placed on the conveying unit 30 (S1000).

For example, as described above, the container size determination unit 228 sends an instruction to the IC tag reader 50 of the observation apparatus 1, and the identification information of the container C is read from the IC tag 51 attached to the container C that is placed on the conveying unit 30. Then, the container size determination unit 228 refers to the light-shielding plate control table 231 stored in the storage unit 210, and acquires the size of the container from the read identification information.

Alternatively, the user may input the size of the container C through the keyboard 203a of the computer 200. Alternatively, the computer 200 may acquire the size of the container C by picking up an image of the container C using the macro observation unit 10 and performing the image processing such as Hough transformation.

Next, the observation system S refers to the light-shielding plate control table 231, and acquires target values of the outer diameter (B1) and the height (B2) of the inner diameter light-shielding plate 66, the inner diameter (A1) of the outer diameter light-shielding plate 74, and the height (H) of the container C from the ring illumination 13, which are stored in association with the size of the container C (S1010).

Then, the observation system S controls the inner diameter light-shielding plate extending motor 61, the inner diameter light-shielding plate up/down motor 62, the drive ring rotating motor 71, and the z-axis motor 48 so that the outer diameter (B1) and the height (B2) of the inner diameter light-shielding plate 66, the inner diameter (A1) of the outer diameter light-shielding plate 74, and the height (H) of the container C from the ring illumination 13 are controlled so as to be the above target values (S1020).

This makes it possible to make uniform the brightness of the bottom surface of the container C illuminated by the ring illumination 13 and make appropriate the brightness for picking up an image of the container C using the macro observation unit 10. Thus, acquisition of a high-quality macro observation image of the container C is enabled. Specifically, for example, it is made possible to acquire the macro observation image capable of discriminating a cell mass formed in the container C with accuracy.

Then, the observation system S performs a macro observation of the container C (S1030). Specifically, the computer 200 sends an instruction to the macro observation unit 10 of the observation apparatus 1 and picks up an image of the entire container C, thereby acquiring an image of the entire container C (macro observation image).

Then, the observation system S detects the position of a cell mass (colony) formed in the container C (S1040).

Next, the observation system S detects the position of the cell mass, and thereafter sends an instruction to the micro observation unit 20 to magnify and pick up an image of the vicinity of the detected position of the cell mass, thereby acquiring a magnified observation image (S1050).

Then, the observation system S analyzes the magnified observation image and performs state determination such as shape determination of each cell mass (S1060).

Then, the observation system S presents observation results to the user by outputting them to the monitor 204a, for example (S1070). Further, the observation system S stores the observation results, the macro observation image, the magnified observation image, and the like, in the storage unit 210, as needed.

==Optimization of Brightness of Container C==

Next, a description will be given, with reference to FIGS. 14 to 17, of control of the outer diameter light-shielding plate (first light-shielding plate) 74 and the inner diameter light-shielding plate (second light-shielding plate) 66 that is performed to optimize the brightness of the bottom surface of the container C when the container C is illuminated by the ring illumination 13.

As described above, since the ring illumination 13 is fixed at a predetermined position in an interior of the observation apparatus 1, the position of the LED 16 serving as a light source cannot be changed. Whereas, the containers C of various sizes are used depending on characteristics, type, and the like of a cell mass to be observed.

Figure 16:
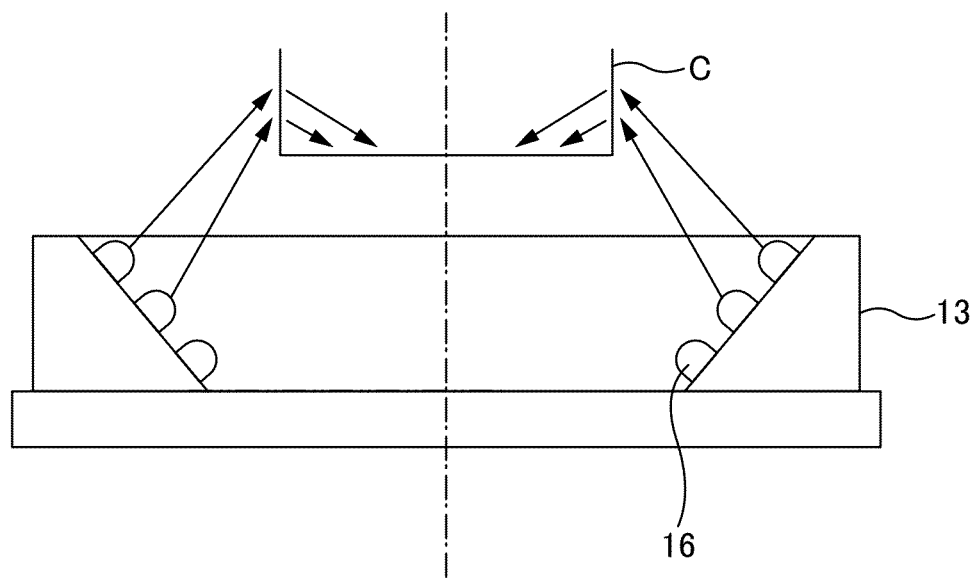
FIG. 16 is an exemplary diagram illustrating how a container is illuminated by a ring illumination according to an embodiment of the present disclosure.

In this case, first, as illustrated in FIG. 16, when the size of the container C is relatively small as compared with that of the ring illumination 13 (for example, when the outer diameter of the container C is smaller than the inner diameter of the ring illumination 13, for example, when the outer diameter of the container C is 60 millimeters whereas the inner diameter of the ring illumination 13 is 70 millimeters), the light applied from the LEDs 16 arranged on the outer circumferential side of the ring illumination 13 is incident on a side surface of the container C at an angle closer to a right angle. Thus, the side surface of the container C shines more strongly and the interior of the container C is illuminated brightly, with the light scattering at the side surface of this container C and thereafter passing therethrough, as scattered light in the container C.

In this case, when an image of the inner bottom surface of the container C is picked up from above, the circumferential part of the bottom surface close to the side surface shines more brightly as compared with the central part of the bottom surface of the container C, which causes uneven brightness.

Figure 17:
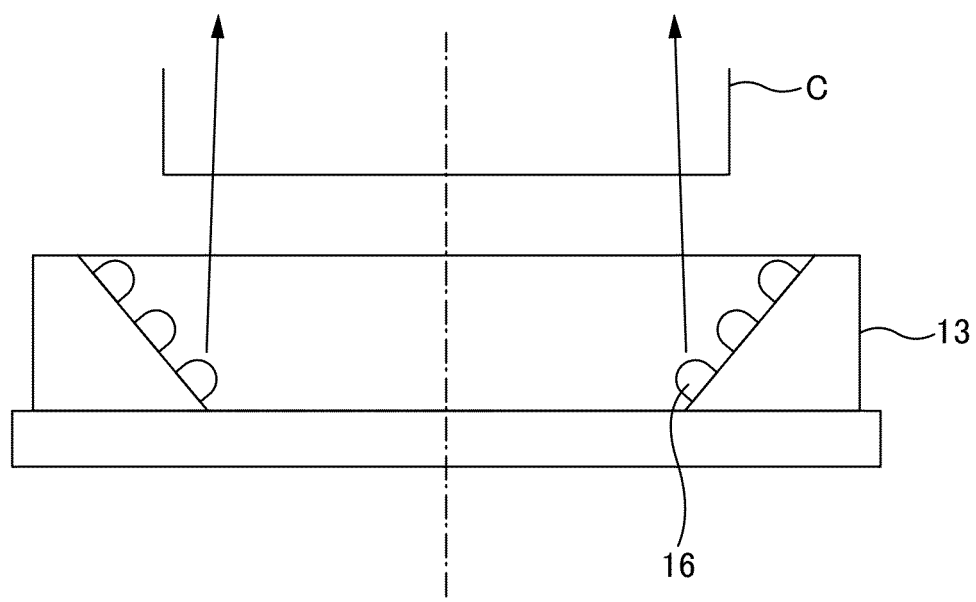
FIG. 17 is an exemplary diagram illustrating how a container is illuminated by a ring illumination according to an embodiment of the present disclosure.

Further, for example, as illustrated in FIG. 17, when the size of the container C is relatively large as compared with that of the ring illumination 13 (for example, when the outer diameter of the container C is larger than the inner diameter of the ring illumination 13, for example, when the outer diameter of the container C is 100 millimeters whereas the inner diameter of the ring illumination 13 is 70 millimeters), the side surface of the container C is irradiated with less light from the ring illumination 13, but the light applied from the LEDs 16 arranged on the inner circumferential side of the ring illumination 13 is incident on the bottom surface of the container C at an angle substantially perpendicular thereto, and thus this light passes through the container C and enters the lens 11 as it is.

Therefore, when an image of the container C is picked up from above, the LEDs 16 are directly imaged in the circumferential part of the container C, thereby making it difficult to image the cell in the container C.

Likewise, also when the position of the ring illumination 13 and the position of the container C are distant from each other by more than a predetermined distance, the light applied from the LEDs 16 arranged on the inner circumferential side of the ring illumination 13 enters the bottom surface of the container C at an angle almost perpendicular thereto, and thus this light passes through the container C and enters the lens 11 as it is.

As described above, the observation system S according to an embodiment of the present disclosure includes the inner diameter light-shielding plate 66 and the outer diameter light-shielding plate 74 in the ring illumination 13, and controls them, thereby being able to optimally control the brightness of the container C illuminated by the ring illumination 13.

Figure 14:
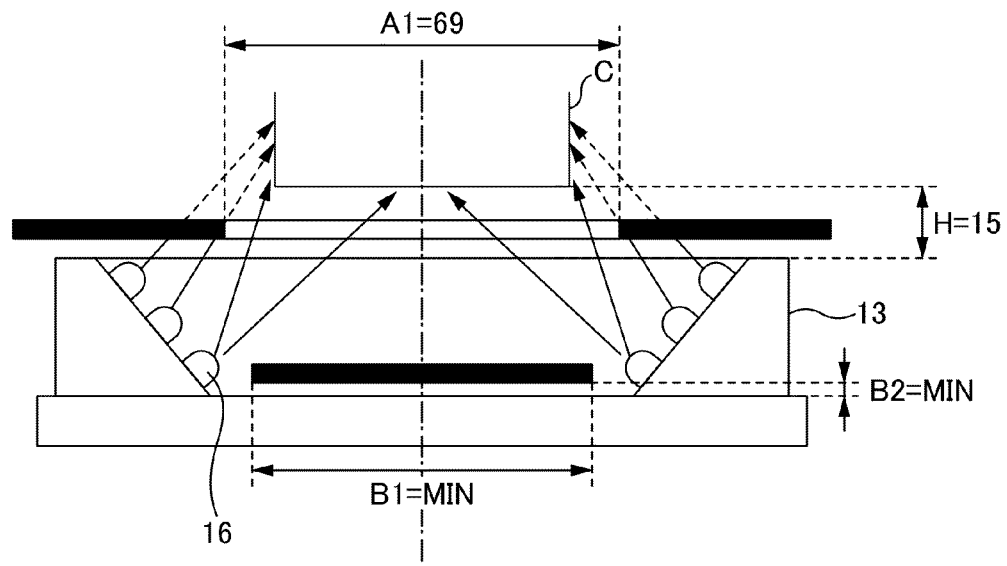
FIG. 14 is an exemplary diagram illustrating how a container is illuminated by a ring illumination according to an embodiment of the present disclosure.

FIG. 14 illustrates how the brightness of the bottom surface of the container C is optimally controlled by using the outer diameter light-shielding plate 74, in the case of the observation of the container C which is relatively small as compared with the ring illumination 13 (for example, the container C having an outer diameter of 60 millimeters).

In this case, the inner diameter (A1) of the outer diameter light-shielding plate 74 and the distance (H) between the ring illumination 13 and the bottom surface of the container C are controlled to the predetermined dimensions, thereby principally intercepting the light applied to the side surface of the container C from the LEDs 16 that are arranged on the outer circumferential side of the ring illumination 13, and thus an amount of light applied to the side surface of the container C is suppressed and the scattered light from the side surface of the container C is reduced. This can suppress the brightness of the side surface of the container C, thereby being able to make uniform the brightness of the bottom surface of the container C.

Note that, in this case, according to a preliminary experiment, the brightness of the bottom surface of the container C can be optimized without using the inner diameter light-shielding plate 66, and thus, as illustrated in FIG. 14, the outer diameter of the inner diameter light-shielding plate 66 is set to a minimum, and further the height of the inner diameter light-shielding plate 66 is also set to a minimum.

As such, the observation system S according to an embodiment of the present disclosure can be configured not to use the inner diameter light-shielding plate 66, by setting the diameter and the height of the inner diameter light-shielding plate 66 to the minimum when the inner diameter light-shielding plate 66 is not necessary.

Further, although not illustrated in FIG. 14, the use of the diffusion plate 80 provided between the outer diameter light-shielding plate 74 and the container C further reduces the intensity of the light applied to the container C, and thus the brightness of the bottom surface of the container C can be made more uniform.

Needless to say, the observation system S can be configured not to use the diffusion plate 80, when the brightness of the container C can be made sufficiently uniform by the outer diameter light-shielding plate 74 and the inner diameter light-shielding plate 66.

Figure 15:
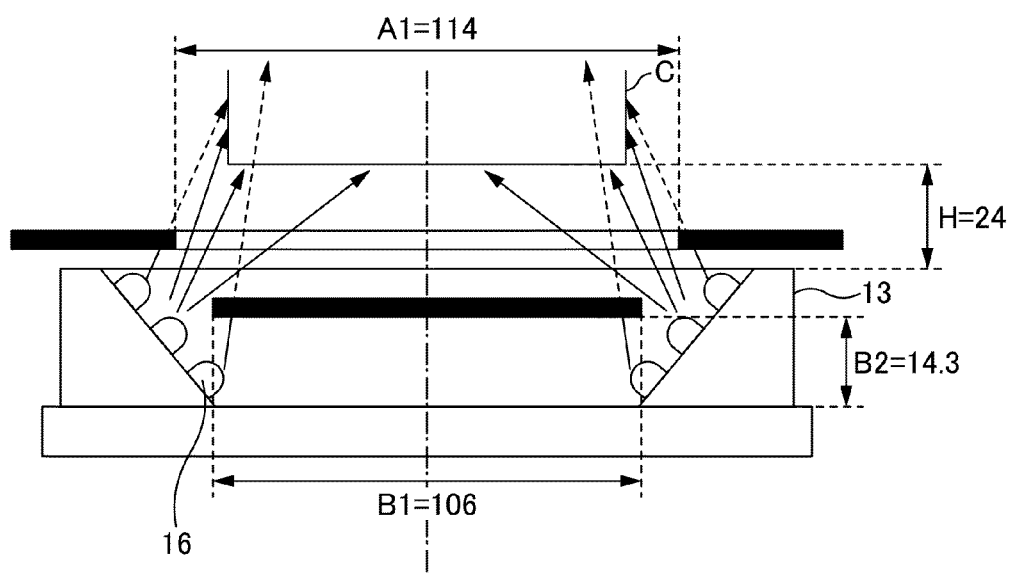
FIG. 15 is an exemplary diagram illustrating how a container is illuminated by a ring illumination according to an embodiment of the present disclosure.

Next, FIG. 15 illustrates how the brightness of the bottom surface of the container C is optimally controlled by using the outer diameter light-shielding plate 74 and the inner diameter light-shielding plate 66, in the case of the observation of the container C which is relatively large as compared with the ring illumination 13 (for example, the container C having an outer diameter of 100 millimeters).

In this case, the inner diameter (A1) of the outer diameter light-shielding plate 74, the outer diameter (B1) and the height (B2) of the inner diameter light-shielding plate 66, and the distance (H) between the ring illumination 13 and the bottom surface of the container C are controlled to predetermined dimensions, thereby principally intercepting the light incident on the bottom surface of the container C in a substantially perpendicular manner from the LEDs 16 that are arranged on the outer circumferential side of the ring illumination 13 is intercepted, and thus the light is caused not to be directly applied to a bottom surface part of the container C and an amount of light applied to the bottom surface of the container C is suppressed. This makes it possible to not directly irradiate the bottom surface of the container C with the light of the LEDs 16, thereby being able to make uniform the brightness of the bottom surface of the container C.

Further, the inner diameter of the outer diameter light-shielding plate 74 is also controlled to an optimum value, thereby appropriately intercepting the light from the LEDs 16 that are arranged on the outer circumferential side of the ring illumination 13, and thus an amount of light applied to the side surface part of the container C is reduced. Therefore, the brightness of the side surface of the container C is moderately suppressed and the brightness of the bottom surface of the container C can be made uniform.

Further, although not illustrated in FIG. 15, the use of the diffusion plate 80 provided between the outer diameter light-shielding plate 74 and the container C further reduces the intensity of the light applied to the container C, and thus the brightness of the bottom surface of the container C can be made more uniform.

In this case, similarly, when the brightness of the container C can be made sufficiently uniform by the outer diameter light-shielding plate 74 and the inner diameter light-shielding plate 66, a configuration can be made such that the diffusion plate 80 is not used.

Figure 18:
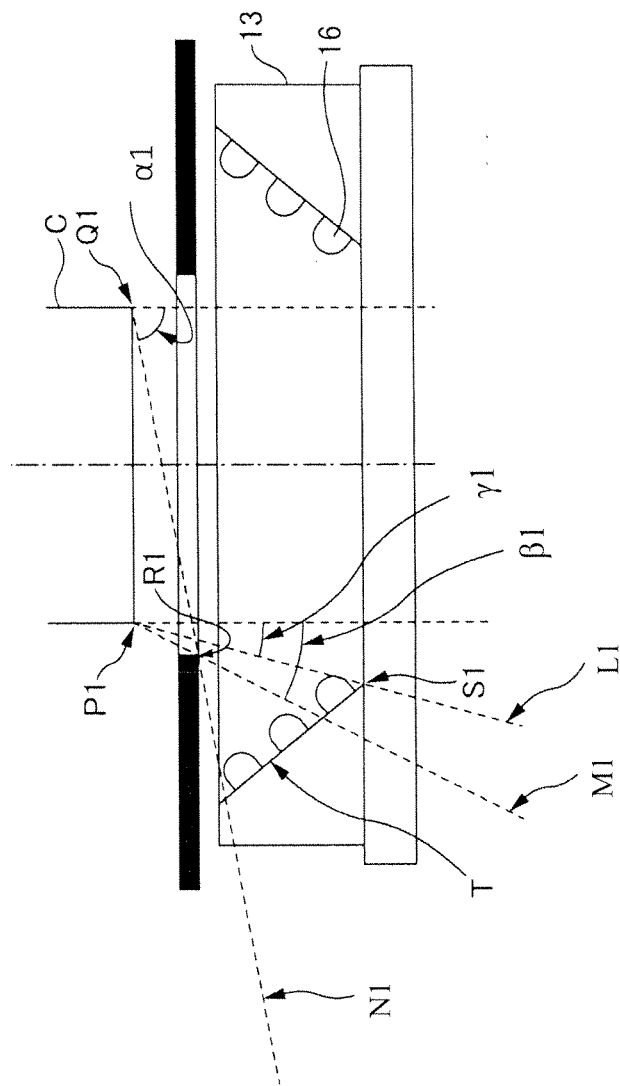
FIG. 18 is an exemplary diagram of a positional interrelationship of a ring illumination, an outer diameter light-shielding plate, an inner diameter light-shielding plate, and a container according to an embodiment of the present disclosure.
Figure 19:
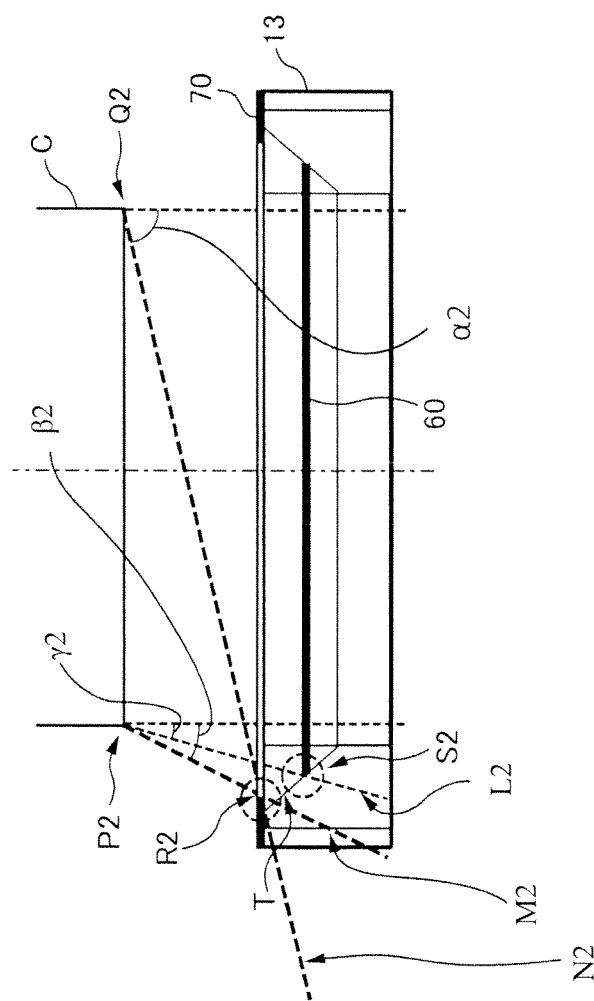
FIG. 19 is an exemplary diagram of a positional interrelationship of a ring illumination, an outer diameter light-shielding plate, an inner diameter light-shielding plate, and a container according to an embodiment of the present disclosure.

Next, a description will then be given, with reference to FIGS. 18 and 19, of a method of determining the inner diameter (A1) of the outer diameter light-shielding plate 74, the outer diameter (B1) and the height (B2) of the inner diameter light-shielding plate 66, and the distance (H) between the ring illumination 13 and the bottom surface of the container C, according to the size of the container C.

FIG. 18 is a diagram for describing a positional interrelationship of the container C, the ring illumination 13, the inner diameter light-shielding plate 66, and the outer diameter light-shielding plate 74, in the case of using the container C, for example, having an outer diameter of 60 millimeters. Note that the ring illumination 13 measures 100 millimeters in outer diameter, 70 millimeters in inner diameter, and 22 millimeters in height.

As illustrated in FIG. 18, the positional interrelationship thereof is specified by an inner diameter light-shielding plate limit line L1, an outer diameter light-shielding plate limit line M1, an outer diameter light-shielding plate irradiation-capable line N1, an outer diameter light-shielding plate irradiation-capable angle α1, an outer diameter light-shielding plate limit angle β1, and an inner diameter light-shielding plate limit angle γ1.

In FIG. 18, the inner diameter light-shielding plate limit line (second light-shielding plate limit line) L1 is a line connecting: a point (S1), located on an innermost circumference, at which the container C can be illuminated without being light-shielded by the inner diameter light-shielding plate 66, on a light source surface (illumination installation line T) of the ring illumination 13; and a point (P1), located at the shortest distance from the S1, on the outer circumference of the bottom surface of the container C.

When the light from the LEDs 16 located inside this inner diameter light-shielding plate limit line L1 is applied to the bottom surface of the container C, the light passing through the bottom surface of the container C directly enters the lens 11 and an image of the LED 16 is picked up by the lens 11.

The outer diameter light-shielding plate limit line (first light-shielding plate limit line) M1 is a line connecting a point (R1) located on the inner circumference of the outer diameter light-shielding plate 74 and the point (P1), located at the shortest distance from the R1, on the outer circumference of the bottom surface of the container C.

When the light from the LEDs 16 located outside this outer diameter light-shielding plate limit line M1 is applied to the side surface of the container C, scattered light from the side surface of the container C increases uneven illuminance on the bottom surface of the container C.

The outer diameter light-shielding plate irradiation-capable line (first light-shielding plate irradiation-capable line) N1 is a line connecting the point (R1), located on the inner circumference of the outer diameter light-shielding plate 74, and a point (Q1), located at the longest distance from the R1, on the outer circumference of the bottom surface of the container C.

The bottom surface of the container C is illuminated brightly by the light from the LEDs 16 located inside this outer diameter light-shielding plate irradiation-capable line N1, and thus if the light from the LEDs 16 located inside this outer diameter light-shielding plate irradiation-capable line N1 is insufficient, the brightness of the container C becomes insufficient.

The outer diameter light-shielding plate irradiation-capable angle (first light-shielding plate irradiation-capable angle) $\alpha 1$ is an angle between a vertical line extending downward passing through the Q1 and the outer diameter light-shielding plate irradiation-capable line N1.

The outer diameter light-shielding plate limit angle (first light-shielding plate limit angle) $\beta 1$ is an angle between a vertical line extending downward passing through the P1 and the outer diameter light-shielding plate limit line M1.

The inner diameter light-shielding plate limit angle (second light-shielding plate limit angle) $\gamma 1$ is an angle between a vertical line extending downward passing through the P1 and the inner diameter light-shielding plate limit line L1.

These values are determined by performing an experiment to illuminate the bottom surface of the container C having an outer diameter of 60 millimeters with the ring illumination 13 having the above sizes, using the observation system S according to an embodiment of the present disclosure.

As a result, the outer diameter light-shielding plate irradiation-capable angle $\alpha 1$ preferably ranges from 70° to 85°, and is preferably 77° in particular. The outer diameter light-shielding plate limit angle $\beta 1$ preferably ranges from 20° to 35°, and is preferably 27° in particular. The inner diameter light-shielding plate limit angle $\gamma 1$ preferably ranges from 10° to 20°, and is preferably 15° in particular.

The values are determined as such, thereby enabling reduction in the uneven brightness, which occurs at the bottom surface of the container C, and also the appropriate brightness of the bottom surface, when the container C having an outer diameter of 60 millimeters is illuminated by the ring illumination 13 having the above sizes.

According to this experiment, the sizes of the outer diameter light-shielding plate 74 and the inner diameter light-shielding plate 66 are preferably set such that the inner diameter (A1) of the outer diameter light-shielding plate 74 is 69 millimeters and the distance (H) between the ring illumination 13 and the bottom surface of the container C is 15 millimeters. Note that the inner diameter light-shielding plate limit line L1 passes closer to the central axis of the ring illumination 13 than the illumination installation line T, and thus, as illustrated in FIG. 18, the inner diameter light-shielding plate 66 can be dispensed with.

Likewise, FIG. 19 is a diagram for describing a positional interrelationship of the container C, the ring illumination 13, the inner diameter light-shielding plate 66, and the outer diameter light-shielding plate 74, in the case of using the container C, for example, having an outer diameter of 100 millimeters. Note that the ring illumination 13 measures 132 millimeters in outer diameter, 96 millimeters in inner diameter, and 22 millimeters in height. Note that, with respect to ones given the same reference numerals as in FIG. 18, descriptions thereof are omitted.

As illustrated in FIG. 19, the positional interrelationship thereof is specified by an inner diameter light-shielding plate limit line L2, an outer diameter light-shielding plate limit line M2, an outer diameter light-shielding plate irradiation-capable line N2, an outer diameter light-shielding plate irradiation-capable angle $\alpha 2$, an outer diameter light-shielding plate limit angle $\beta 2$, and an inner diameter light-shielding plate limit angle $\gamma 2$.

In FIG. 19, the inner diameter light-shielding plate limit line (second light-shielding plate limit line) L2 is a line connecting: a point (S2), located on an innermost circumference, at which the container C can be illuminated without being light-shielded by the inner diameter light-shielding plate 66, on a light source surface (illumination installation line T) of the ring illumination 13; and a point (P2), located at the shortest distance from the S2, on the outer circumference of the bottom surface of the container C.

When the light from the LEDs 16 located inside this inner diameter light-shielding plate limit line L2 is applied to the bottom surface of the container C, the light passing through the bottom surface of the container C directly enters the lens 11 and an image of the LED 16 is picked up by the lens 11.

The outer diameter light-shielding plate limit line (first light-shielding plate limit line) M2 is a line connecting a point (R2) located on the inner circumference of the outer diameter light-shielding plate 74 and the point (P2), located at the shortest distance from the R2, on the outer circumference of the bottom surface of the container C.

When the light from the LEDs 16 located outside this outer diameter light-shielding plate limit line M2 is applied to the side surface of the container C, scattered light from the side surface of the container C increases uneven illuminance on the bottom surface of the container C.

The outer diameter light-shielding plate irradiation-capable line (first light-shielding plate irradiation-capable line) N2 is a line connecting the point (R2), located on the inner circumference of the outer diameter light-shielding plate 74, and a point (Q2), located at the longest distance from the R2, on the outer circumference of the bottom surface of the container C.

The bottom surface of the container C is illuminated brightly by the light from the LEDs 16 located inside this outer diameter light-shielding plate irradiation-capable line N2, and thus if the light from the LEDs 16 located inside this outer diameter light-shielding plate irradiation-capable line N2 is insufficient, the brightness of the container C becomes insufficient.

The outer diameter light-shielding plate irradiation-capable angle (first light-shielding plate irradiation-capable angle) α2 is an angle between a vertical line extending downward passing through the Q2 and the outer diameter light-shielding plate irradiation-capable line N2.

The outer diameter light-shielding plate limit angle (first light-shielding plate limit angle) β2 is an angle between a vertical line extending downward passing through the P2 and the outer diameter light-shielding plate limit line M2.

The inner diameter light-shielding plate limit angle (second light-shielding plate limit angle) γ2 is an angle between a vertical line extending downward passing through the P2 and the inner diameter light-shielding plate limit line L2.

These values are determined by performing an experiment to illuminate the bottom surface of the container C having an outer diameter of 100 millimeters with the ring illumination 13 having the above sizes, using the observation system S according to an embodiment of the present disclosure.

As a result, the outer diameter light-shielding plate irradiation-capable angle α2 preferably ranges from 70° to 85°, and is preferably 77° in particular. The outer diameter light-shielding plate limit angle β2 preferably ranges from 20° to 35°, and is preferably 27° in particular. The inner diameter light-shielding plate limit angle γ2 ranges from 10° to 20°, and is preferably 15° in particular.

The values are determined as such, thereby enabling reduction in the uneven brightness, which occurs at the bottom surface of the container C, and also the appropriate brightness of the bottom surface, when the container C having an outer diameter of 100 millimeters is illuminated by the ring illumination 13 having the above sizes.

According to this experiment, the sizes of the outer diameter light-shielding plate 74 and the inner diameter light-shielding plate 66 are preferably set such that the inner diameter (A1) of the outer diameter light-shielding plate 74 is 114 millimeters, the outer diameter (B1) of the inner diameter light-shielding plate 66 is 106 millimeters, the height (B2) thereof is 7.7 millimeters from the top surface of the ring illumination, and the distance (H) between the ring illumination 13 and the bottom surface of the container C is 24 millimeters.

Figure 20:
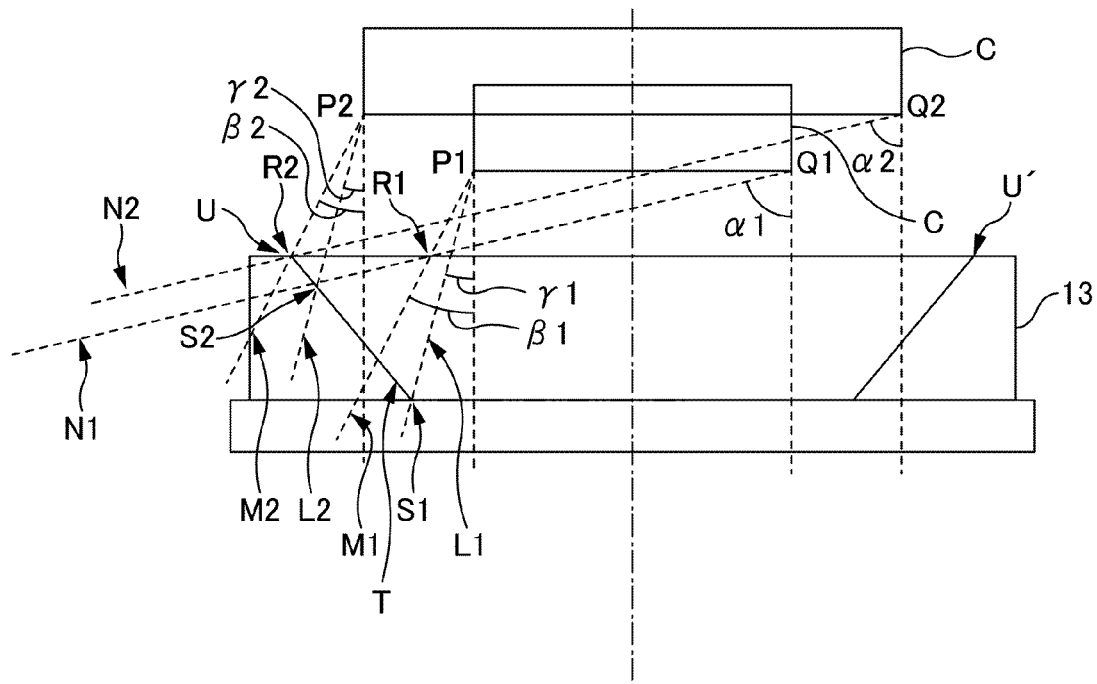
FIG. 20 is an exemplary diagram of a positional interrelationship of a ring illumination, an outer diameter light-shielding plate, an inner diameter light-shielding plate, and a container according to an embodiment of the present disclosure.

As described hereinabove, the inner diameter (A1) of the outer diameter light-shielding plate 74, the outer diameter (B1) and the height (B2) of the inner diameter light-shielding plate 66, and the distance (H) between the ring illumination 13 and the bottom surface of the container C can be determined according to the size of the container C, and further, as illustrated in FIG. 20, it is also possible to make a configuration such that a ring illumination 13 is used which is common to both the container C having an outer diameter of 60 millimeters and the container C having an outer diameter of 100 millimeters.

According to FIG. 20, with the use of the ring illumination 13 having an outer diameter of 132 millimeters; an inner diameter of 76 millimeters; and a height of 34 millimeters, the outer diameter light-shielding plate irradiation-capable angles α1 and α2 can be set in a range from 70° to 85°; the outer diameter light-shielding plate limit angles β1 and β2 can be set in a range from 20° to 35°; and the inner diameter light-shielding plate limit angles γ1 and γ2 can be set in a range from 10° to 20°, in both the cases of the container C having an outer diameter of 60 millimeters and the container C having an outer diameter of 100 millimeters. However, at least the following two conditions need to be met so that the whole bottom surface of the container is irradiated with the light from the ring illumination 13.

Condition 1: the inner diameter (A1) of the outer diameter light-shielding plate 74 is larger than the outer diameter of the container C.

Condition 2: the distance between a point U on the inner circumference of the top surface of the ring illumination 13 and a point U' opposed thereto (UU' is equal to the inner diameter on the top surface of the ring illumination 13) is larger than the outer diameter of the container C.

As described hereinabove, the uneven brightness of the bottom surface of the container C can be reduced by controlling the inner diameter (A1) of the outer diameter light-shielding plate 74, the outer diameter (B1) and the height (B2) of the inner diameter light-shielding plate 66, and the distance (H) between the ring illumination 13 and the bottom surface of the container C, in both the cases of the container C having an outer diameter of 60 millimeters and the container C having an outer diameter of 100 millimeters, and thus the ring illumination 13 can be used in common thereto.

Experimental Examples

Next, FIGS. 21 and 22 illustrate experimental examples in the case where the bottom surface of the container C is illuminated by the ring illumination 13, using the observation system S according to an embodiment of the present disclosure.

The ring illumination 13 used for the experiments is LDR2-100SW2-LA manufactured by CCS Inc., and is configured such that 60 white LEDs 16 in each circle are aligned in three rows on an inclined surface in a ring shape facing inward and diagonally upward. This ring illumination 13 has an outer diameter of 100 millimeters, an inner diameter of 70 millimeters, and a height of 22 millimeters.

Further, the container C used for the experiments is a culture container having an outer diameter of 60 millimeters.

Further, the CMOS camera 12 used for the experiments is of a 1/2.5-inch format and the lens 11 has a focal length of 9 millimeters.

The experiments have been performed with the distance between the lens 11 and the bottom surface of the container C being set at 157.5 millimeters to 167.5 millimeters.

Figure 21A:
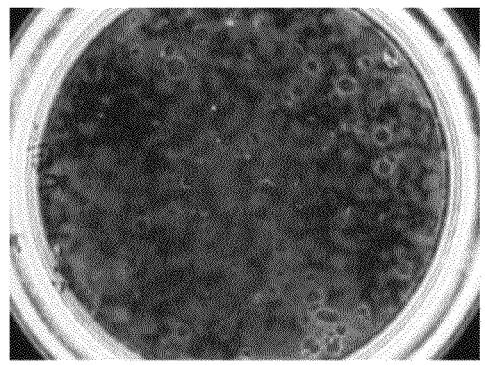
FIG. 21A is an exemplary diagram of a container illuminated by a ring illumination according to an embodiment of the present disclosure.
Figure 21B:
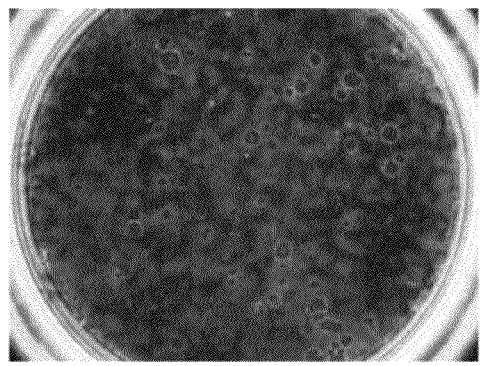
FIG. 21B is an exemplary diagram of a container illuminated by a ring illumination according to an embodiment of the present disclosure.
Figure 21C:
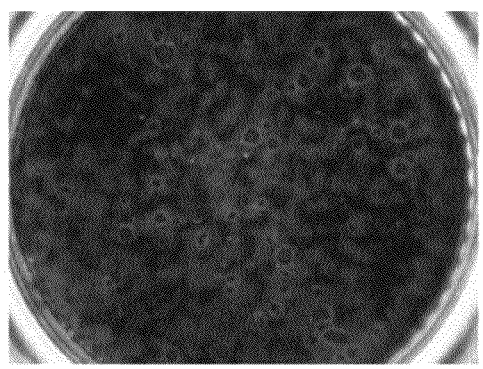
FIG. 21C is an exemplary diagram of a container illuminated by a ring illumination according to an embodiment of the present disclosure.

First, FIGS. 21A, 21B, and 21C illustrate macro observation images picked up, with the distance (H) between the ring illumination 13 and the bottom surface of the container C being varied, in a state where the inner diameter (A1) of the outer diameter light-shielding plate 74 is fixed at 67 millimeters. FIG. 21A, FIG. 21B, and FIG. 21C illustrate macro observation image examples in the case of H=7 millimeters, H=15 millimeters, and H=22 millimeters, respectively.

In the case of FIGS. 21A and 21B, such illuminance is acquired that is sufficient for identifying a cell mass in the container C, but in the case of FIG. 21C, illuminance is insufficient as a whole. Further, in the case of FIG. 21C, the picked up images of the LEDs 16 of the ring illumination 13 can be seen at a boundary part between the bottom surface and the side surface of the container C.

When FIGS. 21A and 21B are compared, it can be confirmed that FIG. 21B has less uneven brightness and a more clear image of each cell mass.

Figure 22A:
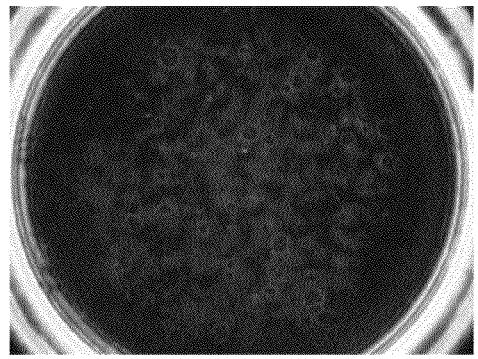
FIG. 22A is an exemplary diagram of a container illuminated by a ring illumination according to an embodiment of the present disclosure.
Figure 22B:
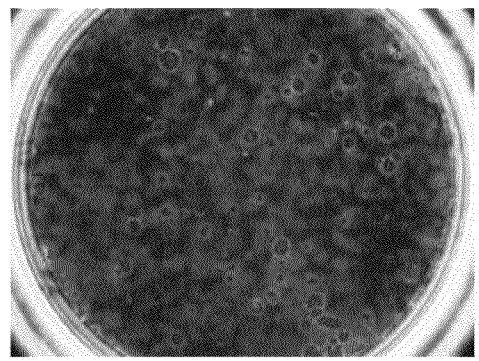
FIG. 22B is an exemplary diagram of a container illuminated by a ring illumination according to an embodiment of the present disclosure.
Figure 22C:
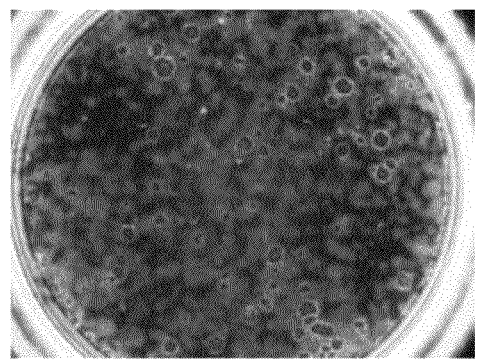
FIG. 22C is an exemplary diagram of a container illuminated by a ring illumination according to an embodiment of the present disclosure.

Next, FIGS. 22A, 22B, and 22C illustrate macro observation images picked up, with the inner diameter (A1) of the outer diameter light-shielding plate 74 being varied from 61 millimeters to 71 millimeters, in a state where the distance (H) between the ring illumination 13 and the bottom surface of the container C is fixed at 15 millimeters. FIGS. 22A, 22B, and 22C illustrate macro observation image examples in the case of A1=61 millimeters, A1=67 millimeters, and A1=71 millimeters, respectively.

In the case of FIGS. 22B and 22C, such illuminance is acquired that is sufficient for identifying a cell mass in the container C, but in the case of FIG. 22A, especially the illuminance is insufficient, especially, at a peripheral part of the container C.

When FIGS. 22B and 22C are compared, it can be confirmed that FIG. 22B has less uneven brightness and a more clear image of each cell mass.

Although these experimental examples are given as an example, these experiments are performed by using the container C of various sizes, thereby being able to find out values to be set in the light-shielding plate control table 231 illustrated in FIG. 11.

Further, for example, as will be described below using FIGS. 23 and 24, optimum values can also be found by performing calculations on paper, without performing such experiments as above. Alternatively, the calculations on paper are performed prior to the experiments, thereby being able to reduce trials and errors for finding the optimum values through the experiments.

Figure 23:
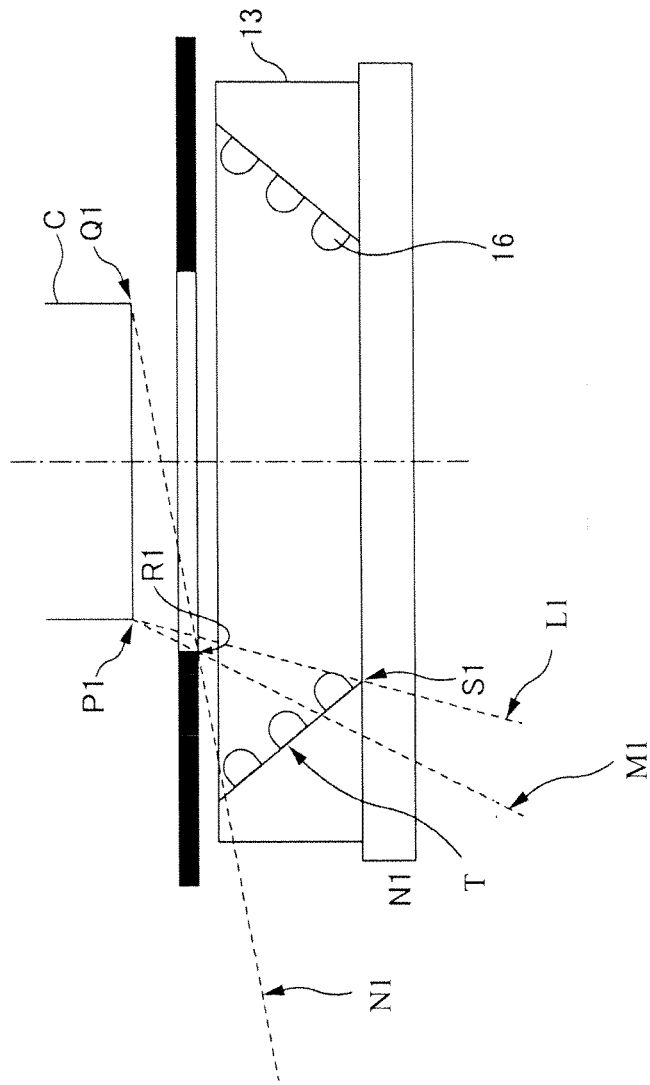
FIG. 23 is an exemplary diagram of a positional interrelationship of a ring illumination, an outer diameter light-shielding plate, an inner diameter light-shielding plate, and a container according to an embodiment of the present disclosure.

FIG. 23 illustrates a state where, for example, the above experiments are performed using the container C having an outer diameter of 60 millimeters and the brightness on the bottom surface of the container C is determined to be optimum.

First, in this state, a relative positional relationship between the container C and the ring illumination 13 is specified by the inner diameter light-shielding plate limit line L1, the outer diameter light-shielding plate limit line M1, and the outer diameter light-shielding plate irradiation-capable line N1, indicated by three dotted lines in FIG. 23.

In FIG. 23, the inner diameter light-shielding plate limit line L1 is a line connecting the point (S1), located on an innermost circumference of the ring illumination 13, and the point (P1), located at the shortest distance from the S1, on an outer circumference of the bottom surface of the container C.

When the light from the LEDs 16 located inside this inner diameter light-shielding plate limit line L1 is applied to the bottom surface of the container C, the light passing through the bottom surface of the container C at an angle substantially perpendicular thereto directly enters the lens 11, and an image of the LED 16 is picked up by the lens 11.

The outer diameter light-shielding plate limit line M1 is a line connecting the point (R1) located on the inner circumference of the outer diameter light-shielding plate 74 and the point (P1), located at the shortest distance from the R1, on the outer circumference of the bottom surface of the container C.

When the light from the LEDs 16 located outside this outer diameter light-shielding plate limit line M1 is applied to the side surface of the container C, scattered light from the side surface of the container C increases uneven illuminance on the bottom surface of the container C.

The outer diameter light-shielding plate irradiation-capable line N1 is a line connecting the point (R1), located on the inner circumference of the outer diameter light-shielding plate 74 and the point (Q1), located at the longest distance from the R1, on the outer circumference of the bottom surface of the container C.

The bottom surface of the container C is illuminated brightly by the light from the LEDs 16 located inside this outer diameter light-shielding plate irradiation-capable line N1, and thus if the light from the LEDs 16 located inside this outer diameter light-shielding plate irradiation-capable line N1 is insufficient, the brightness of the container C becomes insufficient.

Figure 24:
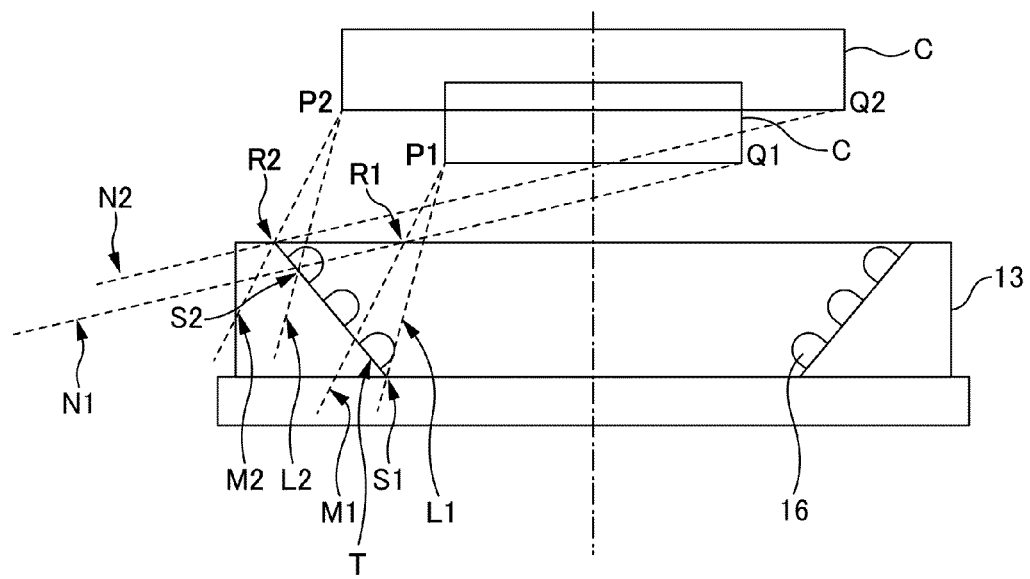
FIG. 24 is an exemplary diagram of a positional interrelationship of a ring illumination, an outer diameter light-shielding plate, an inner diameter light-shielding plate, and a container according to an embodiment of the present disclosure.

Therefore, the inner diameter light-shielding plate limit line L1, the outer diameter light-shielding plate limit line M1, and the outer diameter light-shielding plate irradiation-capable line N1 are acquired using the container C having an outer diameter of 60 millimeters, as illustrated in FIG. 23, thereby being able to acquire an optimum relative positional relationship between the container C and the ring illumination 13, for example, in the case of using the container C having an outer diameter of 100 millimeters, as illustrated in FIG. 24.

That is to say, the container C having an outer diameter of 100 millimeters only has to be arranged at such a position that the inner diameter light-shielding plate limit line L2, the outer diameter light-shielding plate limit line M2, and the outer diameter light-shielding plate irradiation-capable line N2, in the case of using the container C having an outer diameter of 100 millimeters, are in parallel with the inner diameter light-shielding plate limit line L1, the outer diameter light-shielding plate limit line M1, and the outer diameter light-shielding plate irradiation-capable line N1, in the case of using the container C having an outer diameter of 60 millimeters, respectively.

In such a manner, it is made possible to acquire the inner diameter of the outer diameter light-shielding plate 74 and the outer diameter and the height of the inner diameter light-shielding plate 66, without performing the experiments for arranging the container C having an outer diameter of 100 millimeters at an optimum position.

Second Embodiment

Figure 25:
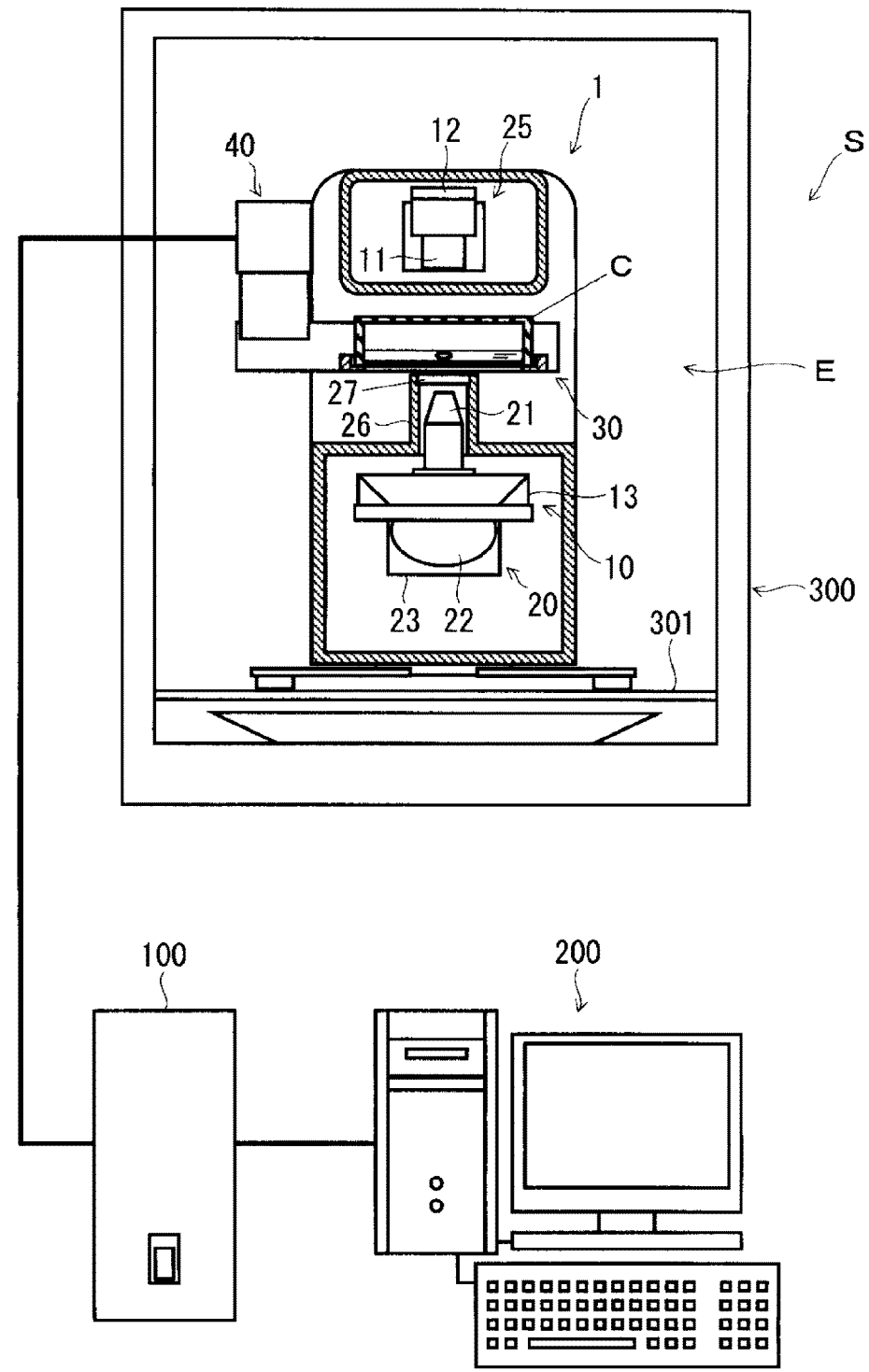
FIG. 25 is an exemplary configuration diagram of an observation apparatus system according to an embodiment of the present disclosure.

Next, a description will be given of a configuration of the observation system S according to a second embodiment of the present disclosure with reference to FIG. 25. FIG. 25 is a configuration diagram of the observation system S. Note that since a basic configuration of an embodiment of the present disclosure is the same as that of the aforementioned first embodiment described with reference to FIGS. 1 to 24, the same reference numerals are given to the constituent elements common to those in the first embodiment, and the figures and the descriptions thereof will be omitted.

The observation apparatus 1 of the observation system S according to a second embodiment of the present disclosure is included in the interior of an incubator 300, as illustrated in FIG. 25. The incubator 300 is an example of a storage case for culturing or storing a cell, and forms a biologically and physically sealed storage space E. The observation apparatus 1 is installed on a shelf 301 provided in the interior of the incubator 300 and is used.

In many cases, the interior of the incubator 300 is kept in an interior environment, for example, with a room temperature of 37° C. and a humidity of 100%. In such an environment, there is a high possibility of failure, such as image quality deterioration due to fogging of an optical system which is caused by the humidity; and short-circuits in electric components in a drive mechanism, a camera, a lighting device and the like. Thus, particularly in the case of being arranged in the interior of the incubator 300, the observation apparatus 1 needs a sealed housing (main body 2) thereof.

Even in a configuration in which the observation apparatus 1 is installed in the interior of the incubator 300 as above, the observation apparatus 1 can be provided, which is capable of identifying an emerging cell mass by observing the entire container C and further capable of magnifying the identified cell mass and observing the details thereof, when observing a cell which is being cultured in the container C. Further, such an observation system S can be provided that is capable of continuously observing the identified cell mass from the emergence to the completion of growth thereof.

Third Embodiment

Figure 26:
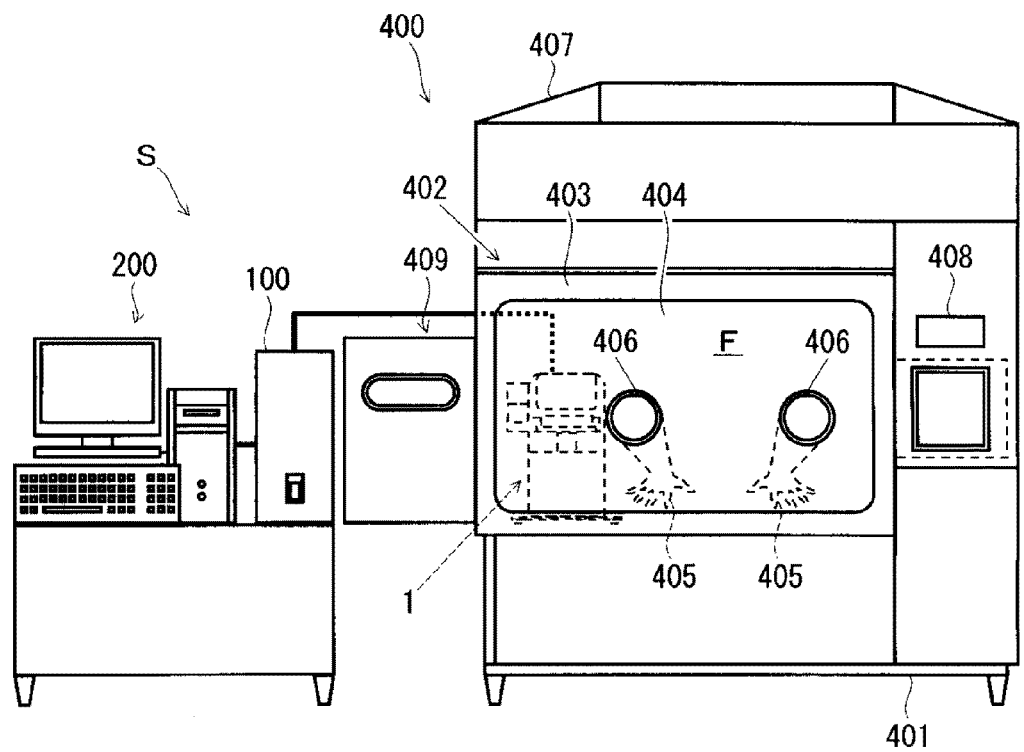
FIG. 26 is an exemplary configuration diagram of an observation apparatus system according to an embodiment of the present disclosure.
Figure 27:
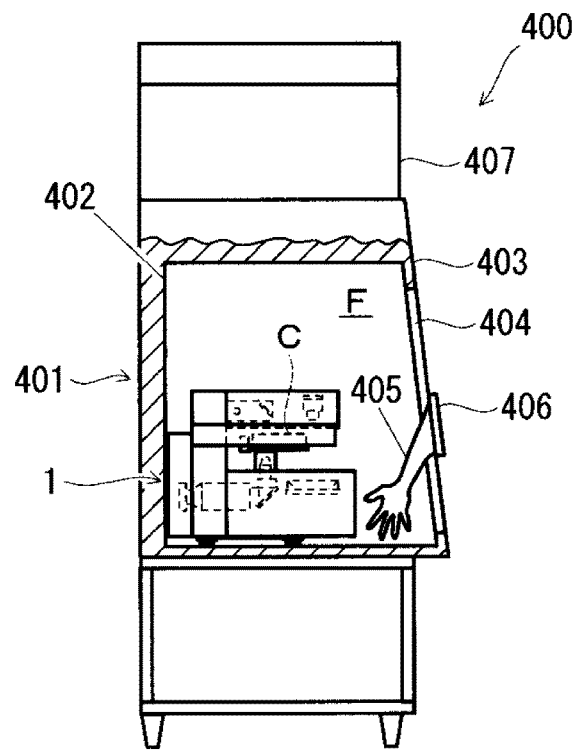
FIG. 27 is an exemplary partial sectional side view of an isolator according to an embodiment of the present disclosure.

Next, a description will be given, with reference to FIGS. 26 and 27, of a configuration of the observation system S according to a third embodiment of the present disclosure. FIG. 26 is a configuration diagram of the observation system S, and FIG. 27 is a partial sectional side view of an isolator illustrated in FIG. 26. Note that since a basic configuration of an embodiment of the present disclosure is the same as that of the aforementioned first embodiment described with reference to FIGS. 1 to 24, the same reference numerals are given to the constituent elements common to those in the first embodiment and the figure and the descriptions thereof are omitted.

The observation apparatus 1 of the observation system S according to the third embodiment is housed in the interior of an isolator 400 as illustrated in FIGS. 26 and 27.

The isolator 400 includes a case 402 at the substantially center part of a main body 401. The case 402 is formed with a working space F sealed biologically and physically for executing a work relating to culture, treatment and observation of a cell. On the front side of the case 402, a front door 403 is provided so as to be capable of being opened/closed. The front door 403 is provided with a window portion 404 constituted by glass for viewing the interior of the working space F from outside.

The window portion 404 of the front door 403 is provided with gloves 405 for conducting work in the working space F. The gloves 405 are provided in the form extending toward the working space F from the window portion 404 of the case 402. At places at which the gloves 405 are attached to the window portion 404, opening portions 406 are provided. The worker inserts his/her hands into the gloves 405 from the opening portions 406 to wear them and conducts work in the working space F while watching the working space F in the sealed case 402 through the window portion 404. The two gloves 405 are provided in parallel in the lateral direction. Note that the numbers of the gloves 405 and the opening portions 406 therefor are not limited to 2 but may be 3, 4 or more in some cases.

The isolator 400 further includes: a gas adjustment unit 407 on an upper part of the case 402; a main body operation unit 408 on the right when the case 402 is seen from the front; and an incubator 409 on the left.

As such, even in the configuration in which the observation apparatus 1 is installed in the interior of the isolator 400, the observation apparatus 1 can be provided, which is capable of identifying an emerging cell mass by observing the entire container C and further capable of magnifying the identified cell mass and observing the details thereof, when observing a cell being cultured in the container C. Further, such an observation system S can be provided that is capable of continuously observing the identified cell mass from the emergence to the completion of growth thereof. Note that the observation apparatus 1 may be installed in the interior of the incubator 409.

Fourth Embodiment

Figure 28:
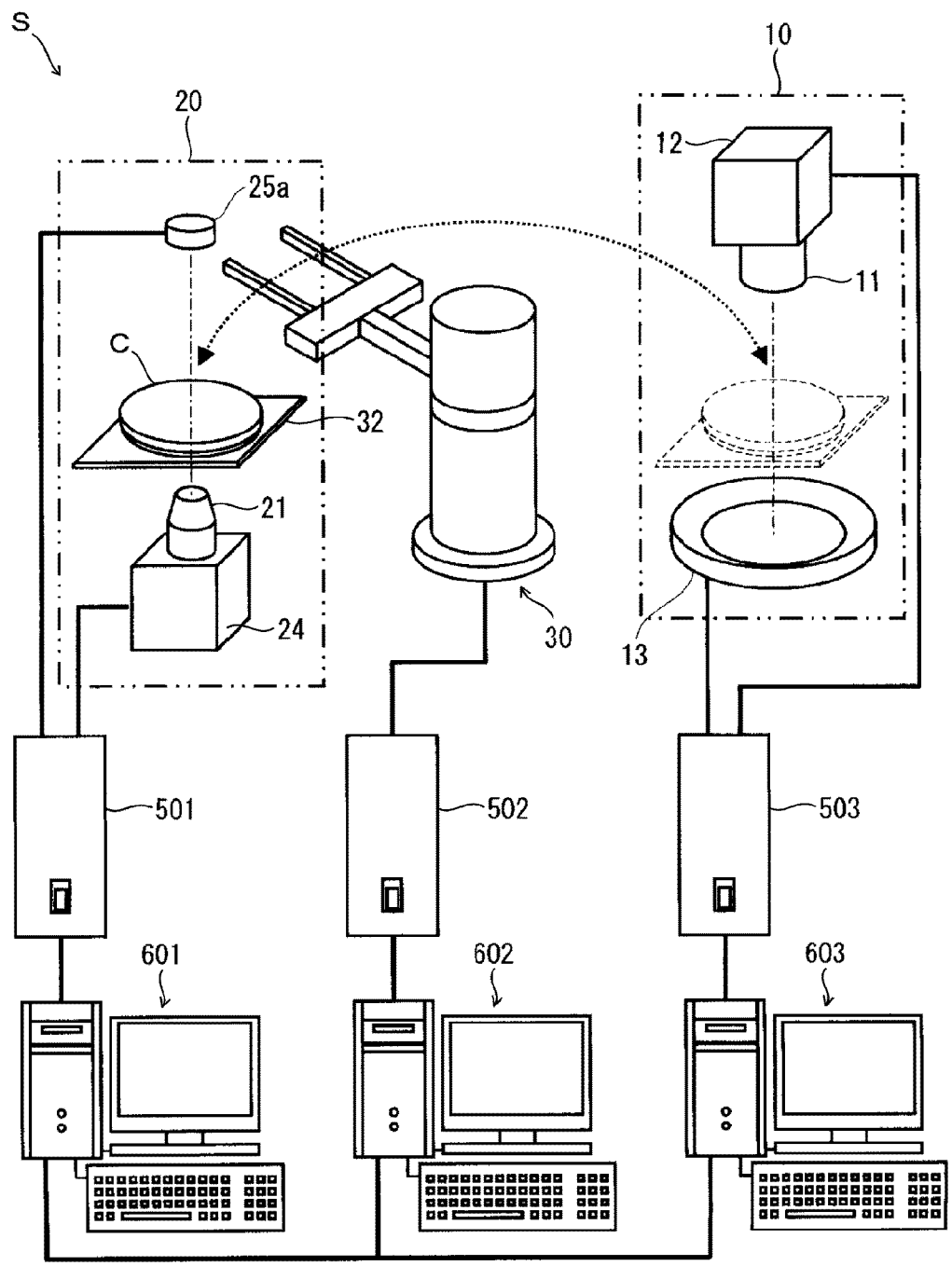
FIG. 28 is an exemplary configuration diagram of an observation apparatus system according to an embodiment of the present disclosure.

Next, a description will be given, with reference to FIG. 28, of a configuration of the observation system S according to a fourth embodiment of the present disclosure. FIG. 28 is a configuration diagram of the observation system S. Note that since a basic configuration of an embodiment of the present disclosure is the same as that of the aforementioned first embodiment described with reference to FIGS. 1 to 24, the same reference numerals are given to the constituent elements common to those in the first embodiment and the figure and the descriptions thereof are omitted.

The observation system S according to the fourth embodiment includes the macro observation unit 10, the micro observation unit 20, and the conveying unit 30 as illustrated in FIG. 28, and they are provided independently from one another. With respect to the macro observation unit 10, the micro observation unit 20, and the conveying unit 30, control devices 501 to 503, which are configured to respectively individually control them, and computers 601 to 603, which are configured to respectively individually send instructions to them, are provided. The three computers 601 to 603 are connected to one another with network cables so that they can communicate with one another, thereby being able to perform the macro observation, micro observation, and conveyance of the container C in coordination with one another.

Note that a configuration may be such that another computer configured to integrally coordinate the three computers is provided. Further, a configuration may be such that a single computer may be provided and instructions are sent from this single computer to the control devices 501 to 503. Furthermore, a configuration may be such that a single computer and a single control device may be provided and the macro observation unit, the micro observation unit, and the conveying unit are controlled from the single computer and the single control device.

Further, the conveying unit 30 illustrated in FIG. 28 is configured to convey the container C between the macro observation unit 10 and the micro observation unit 20 by moving in a rotational manner, however, similarly to the first embodiment, the conveying unit 30 may be configured to convey the container C by moving horizontally. The container C is placed on a placement tray 32 which is common to both the macro observation unit 10 and the micro observation unit 20. Positioning of the placement tray 32 is performed with respect to the macro observation unit 10 and the micro observation unit 20, and positioning of the container C is performed with respect to the placement tray 32.

As such, also in a configuration, in which the macro observation unit 10, the micro observation unit 20, and the conveying unit 30 are independently and individually controlled, the observation system S can be provided which is capable of identifying an emerging cell mass by observing the whole container C and further capable of magnifying the identified cell mass and observing the details thereof, when observing a cell which is being cultured in the container C. Further, such an observation system S can be provided that is capable of continuously observing the identified cell mass from the emergence to the completion of growth thereof.

Note that, in a small working space such as an incubator or an isolator, a flexible configuration in arrangement of units are enabled by configuring the macro observation unit, the micro observation unit, and the conveying unit as separate mechanisms, thereby being able to effectively use the working space.

Hereinabove, embodiments of the present disclosure have been described, and according to the observation system S; a method of controlling the observation system S; and the observation control program 220 of the present disclosure, it is possible to illuminate the container C of various sizes to contain observation targets, such as cells, bacteria, microorganisms, and the like, in a uniform manner with appropriate brightness.

In particular, the diameter and the height of the outer diameter light-shielding plate 74 and the inner diameter light-shielding plate 66 can be controlled in millimeters, thereby being able to control the brightness of the container C with extreme minuteness.

As a result, the macro observation image acquired by picking up an image of the entire container C can be improved to a higher quality image, thereby being able to improve the precision of detection of a cell mass to be formed in the container C. This makes it possible to start the observation of a cell mass, for example, at a stage immediately after emergence of the cell mass, thereby being able to perform advanced observation.

The above embodiments of the present invention are simply for facilitating the understanding of the present invention and are not in any way to be construed as limiting the present invention. The present invention may variously be changed or altered without departing from its spirit and encompass equivalents thereof.

For example, aforementioned embodiments, in which a single culture container is observed, have been described, but an embodiment may be such that a plurality of containers may be observed concurrently by using a tray on which a plurality of culture containers can be placed.

Further, in aforementioned embodiments, the CMOS camera 12 is used for the image pickup unit of the macro observation unit 10 and the CCD camera 24 for the image pickup unit of the micro observation unit 20, but the type of a camera to be used may be either of the CMOS camera and the CCD camera.

Further, in the aforementioned embodiments, descriptions have been made of the case that an entire image of the container C is picked up by the CMOS camera 12 provided in the image pickup unit of the macro observation unit 10 and displayed on the monitor 204a, but an embodiment may be such that the container C is observed directly with eye by an observer, for example, in the case of using a microscope.

What is claimed is:

1. An observation system configured to observe a translucent observation target, contained in a translucent container having a bottom surface and a side surface surrounding the bottom surface, the observation system comprising:
   a container holding unit configured to hold the container;
   a ring illumination including a light source in a ring shape having a predetermined radius, the ring illumination arranged in a position opposed to an outer bottom surface of the container so that a central axis of the ring illumination is aligned to a central axis of the bottom surface of the container held by the container holding unit, and configured to irradiate the container with light, when the observation target is observed;
   a first light-shielding plate in a ring shape, arranged between the ring illumination and the container holding unit so that a central axis of the first light-shielding plate is aligned to the central axis of the ring illumination, the first light-shielding plate having an inner diameter capable of varying around the central axis, the first light-shielding plate configured to shield light from the ring illumination;
   a lens, arranged in a position opposed to an inner bottom surface of the container held by the container holding unit, to observe the observation target in the container illuminated by the ring illumination; and
   a second light-shielding plate arranged, in an internal space of the ring illumination, so that a central axis of the second light-shielding plate is aligned to a central axis of the ring illumination, the second light-shielding plate having an outer diameter capable of varying around the central axis, the second light-shielding plate configured to shield light from the ring illumination,
      wherein the first light-shielding plate is arranged between the container holding unit and the second light-shielding plate.

2. The observation system of claim 1, further comprising:
   a light-shielding plate control table configured to store, with respect to each size of the container, the inner diameter of the first light-shielding plate configured to suppresses an amount of light applied from the ring illumination to the side surface of the container;
   a container size determination unit configured to acquire a size of the container; and
   a light-shielding plate driving unit configured to control the inner diameter of the first light-shielding plate so as to be equal to the inner diameter of the first light-shielding plate stored in the light-shielding plate control table, on a basis of the size of the container acquired by the container size determination unit.

3. The observation system of claim 2, wherein
   the light-shielding plate control table is further configured to store, with respect to each size of the container, the outer diameter of the second light-shielding plate configured to suppress an amount of light applied from the ring illumination to the bottom surface of the container, and
   the light-shielding plate driving unit is further configured to control the outer diameter of the second light-shielding plate so as to be equal to the outer diameter of the second light-shielding plate stored in the light-shielding plate control table, on the basis of the size of the container acquired by the container size determination unit.

4. The observation system of claim 3, wherein
   the light-shielding plate control table is further configured to store, with respect to each size of the container, a height of the second light-shielding plate that is a distance from a lower surface of the ring illumination to the second light-shielding plate, and
   the light-shielding plate driving unit is further configured to move the second light-shielding plate in a direction along the central axis so that a height of the second light-shielding plate is equal to the height of the second light-shielding plate stored in the light-shielding plate control table, on the basis of the size of the container acquired by the container size determination unit.

5. The observation system of claim 1, further comprising:
   a stage driving unit configured to move the container holding unit in a direction along the central axis,
   wherein the light-shielding plate control table is further configured to store, with respect to each size of the container, a height of the container that is a distance from an upper surface of the ring illumination to the outer bottom surface of the container, and
   the stage driving unit is configured to move the container holding unit in a direction along the central axis so that a height of the container is equal to the height of the container stored in the light-shielding plate control table, on a basis of the size of the container acquired by the container size determination unit.

6. The observation system of claim 1, wherein
   in a case where the inner diameter of the first light-shielding plate is larger than an outer diameter of the outer bottom surface of the container, and where an inner diameter of an inner bottom surface of the ring illumination opposed to the container is larger than the outer diameter of the outer bottom surface of the container, and
   when a first light-shielding plate limit line is a line connecting a point R located on an inner circumference of the first light-shielding plate and a point P, located at a shortest distance from the point R, on an outer circumference of the outer bottom surface of the container, a second light-shielding plate limit line is a line connecting
a point S, located on an innermost circumference of the ring illumination, at which the container can be illuminated without being light-shielded by the second light-shielding plate and
a point P', located at a shortest distance from the point S, on the outer circumference of the outer bottom surface of the container,
a first light-shielding plate irradiation-capable line is a line connecting a point Q, located at a longest distance from the point R, on the outer circumference of the outer bottom surface of the container, and the point R,
a first light-shielding plate limit angle is an angle between the first light-shielding limit line and a vertical line extending downward passing through the point P,
a second light-shielding plate limit angle is an angle between the second light-shielding plate limit line and a vertical line extending downward passing through the point P',
a first light-shielding plate irradiation-capable angle is an angle between the first light-shielding plate irradiation-capable line and a vertical line extending downward passing through the point Q,
a first parameter is the inner diameter of the first light-shielding plate,
a second parameter is a distance between the bottom surface of the ring illumination and the second light-shielding plate,
a third parameter is the outer diameter of the second light-shielding plate, and
a fourth parameter is a distance between an upper surface of the ring illumination and the outer bottom surface of the container,
the first light-shielding plate limit angle takes a first value, the second light-shielding plate limit angle takes a second value, and the first light-shielding plate irradiation-capable angle takes a third value, by controlling the first parameter, the second parameter, the third parameter, and the fourth parameter.

7. The observation system of claim 6, further comprising:
a light-shielding plate driving unit configured to control the first parameter and the third parameter;
a z-axis driving unit configured to control the second parameter; and
a stage driving unit configured to control the fourth parameter.

8. The observation system of claim 6, wherein
the first value ranges from 20 to 35 degrees,
the second value ranges from 10 to 20 degrees, and
the third value ranges from 70 to 85 degrees.

9. The observation system of claim 6, wherein
the second light-shielding plate is further configured to be capable of moving in a direction along the central axis.

10. The observation system of claim 6, wherein
the container holding unit is configured to be capable of moving in a direction along the central axis.

11. The observation system of claim 1, further comprising:
a translucent diffusion plate in a ring shape arranged between the first light-shielding plate and the container holding unit so that a central axis of the diffusion plate is aligned to the central axis of the ring illumination, the diffusion plate configured to diffuse light from the ring illumination.

12. The observation system of claim 1, wherein
the ring illumination is configured by arranging a plurality of LEDs in a ring shape, in a plurality of rows, on an inclined surface in a ring shape formed to face inward and diagonally upward.

13. The observation system of claim 1, wherein
the observation target is a cell mass formed by gathering of cells in a culture fluid.

14. A method of controlling an observation system configured to illuminate a translucent container having a bottom surface and a side surface surrounding the bottom surface from a position opposed to an outer bottom surface of the container, using a ring illumination including a light source in a ring shape having a predetermined radius, and to observe a translucent observation target contained in the container illuminated by the ring illumination, using a lens arranged in a position opposed to an inner bottom surface of the container, the method comprising:
the observation system holding the container in such a manner that a central axis of the ring illumination and a central axis of the container are aligned with each other;
the observation system irradiating the container with light, using the ring illumination;
the observation system controlling an inner diameter of a first light-shielding plate in a ring shape, so that an amount of light applied from the ring illumination to the side surface of the container is suppressed, the first light-shielding plate arranged between the ring illumination and the container so that a central axis of the first light-shielding plate is aligned to the central axis of the ring illumination, the first light-shielding plate having the inner diameter capable of varying around the central axis; and
the observation system controlling an outer diameter of a second light-shielding plate arranged in an internal space of the ring illumination and on a side opposite to the container with the first light-shielding plate being sandwiched therebetween, so that a central axis of the second light-shielding plate is aligned to the central axis of the ring illumination, the second light-shielding plate having the outer diameter capable of varying around the central axis.

15. An observation system configured to observe a translucent observation target, contained in a translucent container having a bottom surface and a side surface surrounding the bottom surface, the observation system comprising:
a container holding unit configured to hold the container;
a ring illumination including a light source in a ring shape having a predetermined radius, the ring illumination arranged in a position opposed to an outer bottom surface of the container so that a central axis of the ring illumination is aligned to a central axis of the bottom surface of the container held by the container holding unit, and configured to irradiate the container with light, when the observation target is observed;
a first light-shielding plate in a ring shape, arranged between the ring illumination and the container holding unit so that a central axis of the first light-shielding plate is aligned to the central axis of the ring illumination, the first light-shielding plate having an inner diameter capable of varying around the central axis, the first light-shielding plate configured to shield light from the ring illumination;
a lens, arranged in a position opposed to an inner bottom surface of the container held by the container holding unit, to observe the observation target in the container illuminated by the ring illumination;

a light-shielding plate control table configured to store, with respect to each size of the container, the inner diameter of the first light-shielding plate configured to suppresses an amount of light applied from the ring illumination to the side surface of the container;

a container size determination unit configured to acquire a size of the container; and a light-shielding plate driving unit configured to control the inner diameter of the first light-shielding plate so as to be equal to the inner diameter of the first light-shielding plate stored in the light-shielding plate control table, on a basis of the size of the container acquired by the container size determination unit.

16. The observation system of claim 15, further comprising:

a second light-shielding plate arranged, in an internal space of the ring illumination, so that a central axis of the second light-shielding plate is aligned to a central axis of the ring illumination, the second light-shielding plate having an outer diameter capable of varying around the central axis, the second light-shielding plate configured to shield light from the ring illumination, wherein the light-shielding plate control table is further configured to store, with respect to each size of the container, the outer diameter of the second light-shielding plate configured to suppress an amount of light applied from the ring illumination to the bottom surface of the container, and the light-shielding plate driving unit is further configured to control the outer diameter of the second light-shielding plate so as to be equal to the outer diameter of the second light-shielding plate stored in the light-shielding plate control table, on the basis of the size of the container acquired by the container size determination unit.

17. The observation system of claim 16, wherein:

the light-shielding plate control table is further configured to store, with respect to each size of the container, a height of the second light-shielding plate that is a distance from a lower surface of the ring illumination to the second light-shielding plate, and the light-shielding plate driving unit is further configured to move the second light-shielding plate in a direction along the central axis so that a height of the second light-shielding plate is equal to the height of the second light-shielding plate stored in the light-shielding plate control table, on the basis of the size of the container acquired by the container size determination unit.

18. The observation system of claim 15, further comprising:

a stage driving unit configured to move the container holding unit n a direction along the central axis, wherein the light-shielding plate control table is further configured to store, with respect to each size of the container, a height of the container that is a distance from an upper surface of the ring illumination to the outer bottom surface of the container, and the stage driving unit is configured to move the container holding unit in a direction along the central axis so that a height of the container is equal to the height of the container stored in the light-shielding plate control table, on a basis of the size of the container acquired by the container size determination unit.

19. The observation system of claim 15, wherein:

in a case where the inner diameter of the first light-shielding plate is larger than an outer diameter of the outer bottom surface of the container, and where an inner diameter of an inner bottom surface of the ring illumination opposed to the container is larger than the outer diameter of the outer bottom surface of the container, and when a first light-shielding plate limit line is a line connecting a point R located on an inner circumference of the first light-shielding plate and a point P, located at a shortest distance from the point R, on an outer circumference of the outer bottom surface of the container, a second light-shielding plate limit line is a line connecting a point S, located on an innermost circumference of the ring illumination, at which the container can be illuminated without being light-shielded by the second light-shielding plate and a point P', located at a shortest distance from the point S, on the outer circumference of the outer bottom surface of the container, a first light-shielding plate irradiation-capable line is a line connecting a point Q, located at a longest distance from the point R, on the outer circumference of the outer bottom surface of the container, and the point R, a first light-shielding plate limit angle is an angle between the first light-shielding limit line and a vertical line extending downward passing through the point P, a second light-shielding plate limit angle is an angle between the second light-shielding plate limit line and a vertical line extending downward passing through the point P', a first light-shielding plate irradiation-capable angle is an angle between the first light-shielding plate irradiation-capable line and a vertical line extending downward passing through the point Q, a first parameter is the inner diameter of the first light-shielding plate, a second parameter is a distance between the bottom surface of the ring illumination and the second light-shielding plate, a third parameter is the outer diameter of the second light-shielding plate, and a fourth parameter is a distance between an upper surface of the ring illumination and the outer bottom surface of the container, the first light-shielding plate limit angle takes a first value, the second light-shielding plate limit angle takes a second value, and the first light-shielding plate irradiation-capable angle takes a third value, by controlling the first parameter, the second parameter, the third parameter, and the fourth parameter.

20. The observation system of claim 19, further comprising:

a light-shielding plate driving unit configured to control the first parameter and the third parameter;

a z-axis driving unit configured to control the second parameter; and a stage driving unit configured to control the fourth parameter.

* * * * *